US010023197B2

(12) United States Patent
Marutani et al.

(10) Patent No.: US 10,023,197 B2
(45) Date of Patent: Jul. 17, 2018

(54) CONTROL DEVICE FOR FOUR-WHEEL DRIVE VEHICLE

(71) Applicant: MAZDA MOTOR CORPORATION, Hiroshima (JP)

(72) Inventors: Tetsushi Marutani, Higashihiroshima (JP); Hiraku Nishikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 224 days.

(21) Appl. No.: 15/003,328

(22) Filed: Jan. 21, 2016

(65) Prior Publication Data
US 2016/0214616 A1 Jul. 28, 2016

(30) Foreign Application Priority Data

Jan. 27, 2015 (JP) .................................. 2015-013614
Jan. 27, 2015 (JP) .................................. 2015-013615

(51) Int. Cl.
*B60W 30/20* (2006.01)
*B60W 10/06* (2006.01)
(Continued)

(52) U.S. Cl.
CPC ......... *B60W 30/20* (2013.01); *B60K 23/0808* (2013.01); *B60W 10/06* (2013.01);
(Continued)

(58) Field of Classification Search
None
See application file for complete search history.

(56) References Cited

U.S. PATENT DOCUMENTS 5,373,912 A 12/1994 Haiki et al.
7,877,184 B2 * 1/2011 Watanabe ............. B60W 20/15
180/247

(Continued)

FOREIGN PATENT DOCUMENTS

JP 2001-277881 A 10/2001
JP 2009-257169 A 11/2009

OTHER PUBLICATIONS

An Office Action issued by Chinese Patent Office dated Nov. 15, 2017, which corresponds to Chinese Patent Application No. 201610049074.3 and is related to U.S. Appl. No. 15/003,328.

*Primary Examiner* — Justin Holmes
(74) *Attorney, Agent, or Firm* — Studebaker & Brackett PC

(57) ABSTRACT

A control device controls a four-wheel drive vehicle including an engine, a torque transmission mechanism which transmits an output torque of the engine to main drive wheels and to auxiliary drive wheels, and a torque distribution adjustment mechanism provided in the torque transmission mechanism and configured to adjust torque distribution with respect to the auxiliary drive wheels. The control device is provided with an abnormal noise reduction unit which controls the torque distribution adjustment mechanism to adjust torque distribution with respect to the auxiliary drive wheels in such a manner as to suppress abnormal noise generation when the engine is operated in an abnormal noise generation range in which the torque transmission mechanism is in an abnormal noise generation state. The abnormal noise reduction unit adjusts the torque distribution with respect to the auxiliary drive wheels in accordance with a magnitude of torque fluctuation of the engine.

11 Claims, 15 Drawing Sheets

(51) Int. Cl.
*B60W 10/119* (2012.01)
*B60K 23/08* (2006.01)

(52) U.S. Cl.
CPC ... *B60W 10/119* (2013.01); *B60K 2023/0833* (2013.01); *B60K 2023/0858* (2013.01); *B60W 2030/206* (2013.01); *B60W 2710/06* (2013.01); *B60W 2720/40* (2013.01); *B60Y 2306/09* (2013.01)

(56) References Cited

U.S. PATENT DOCUMENTS

| | | | | |
|---|---|---|---|---|
| 2008/0154468 | A1* | 6/2008 | Berger | B60K 6/365 701/54 |
| 2011/0231071 | A1* | 9/2011 | Phillips | B60K 6/485 701/54 |
| 2011/0288734 | A1* | 11/2011 | Phillips | B60K 6/485 701/58 |
| 2013/0035832 | A1* | 2/2013 | Nozu | B60K 17/35 701/69 |

\* cited by examiner

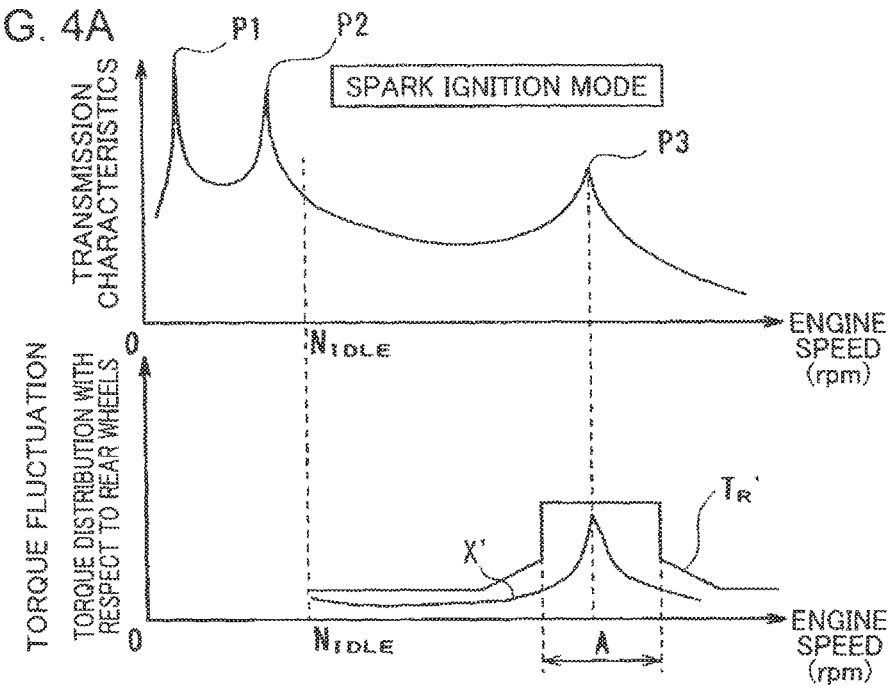
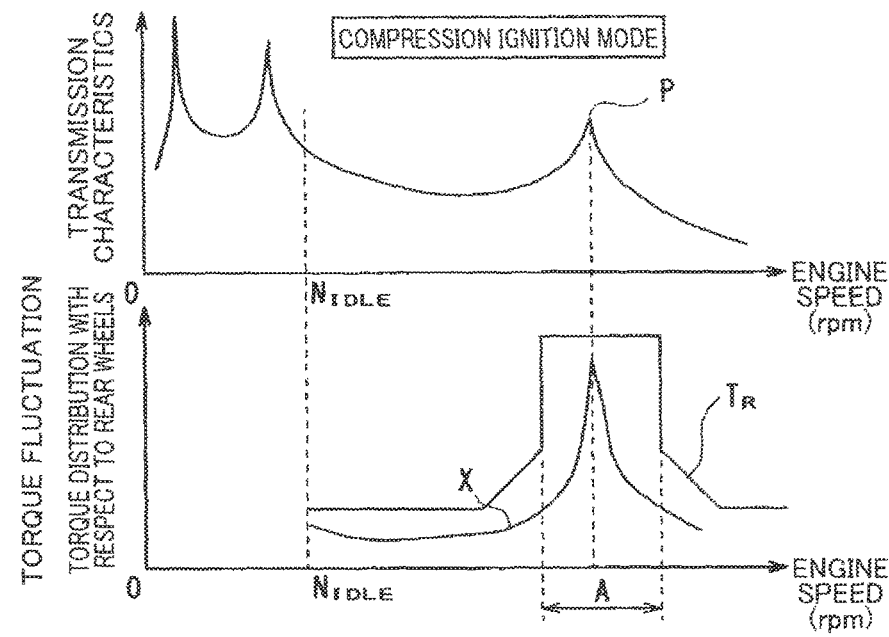

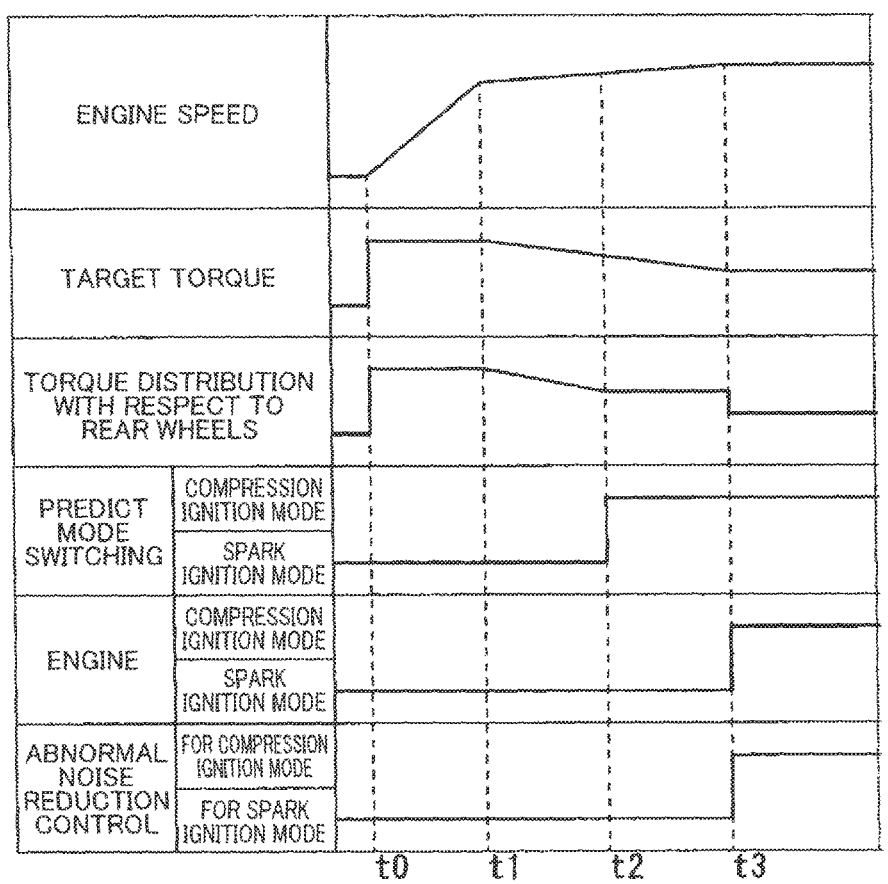

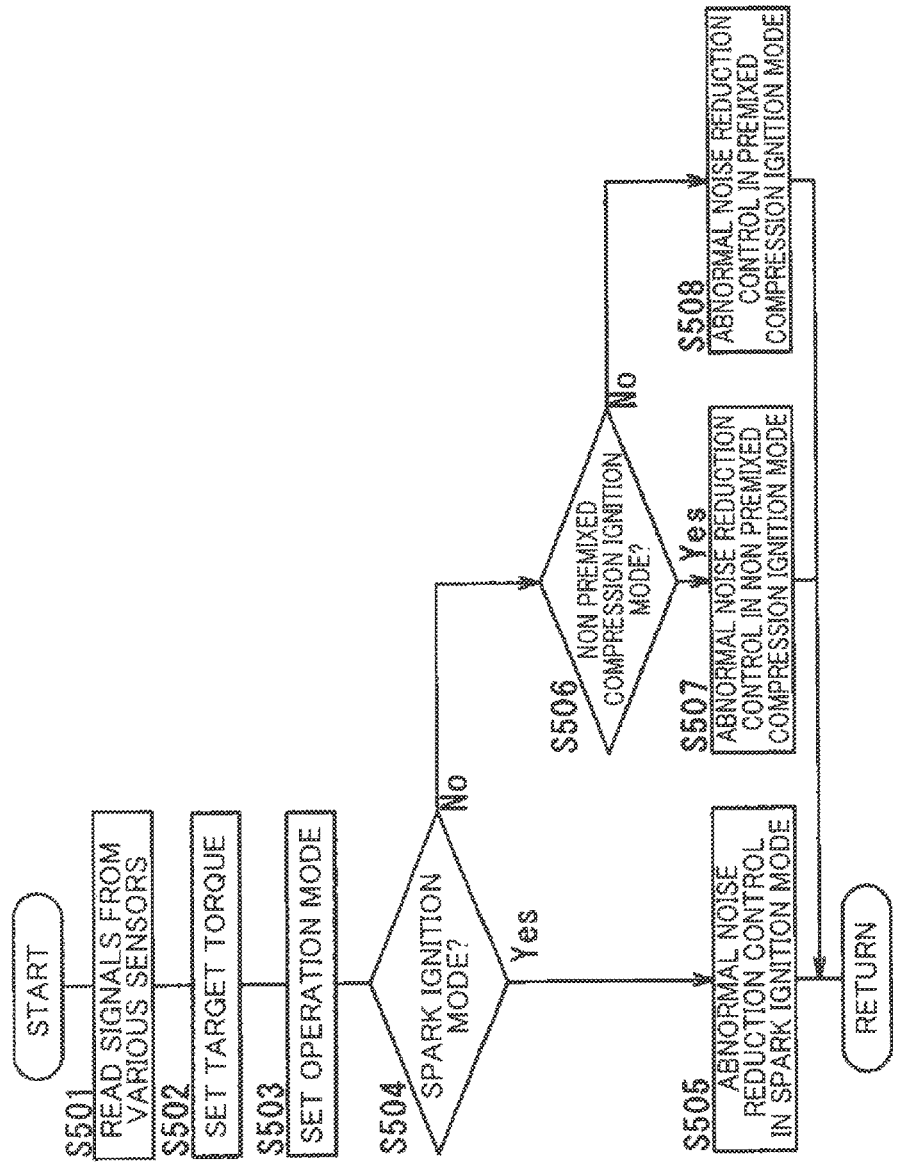

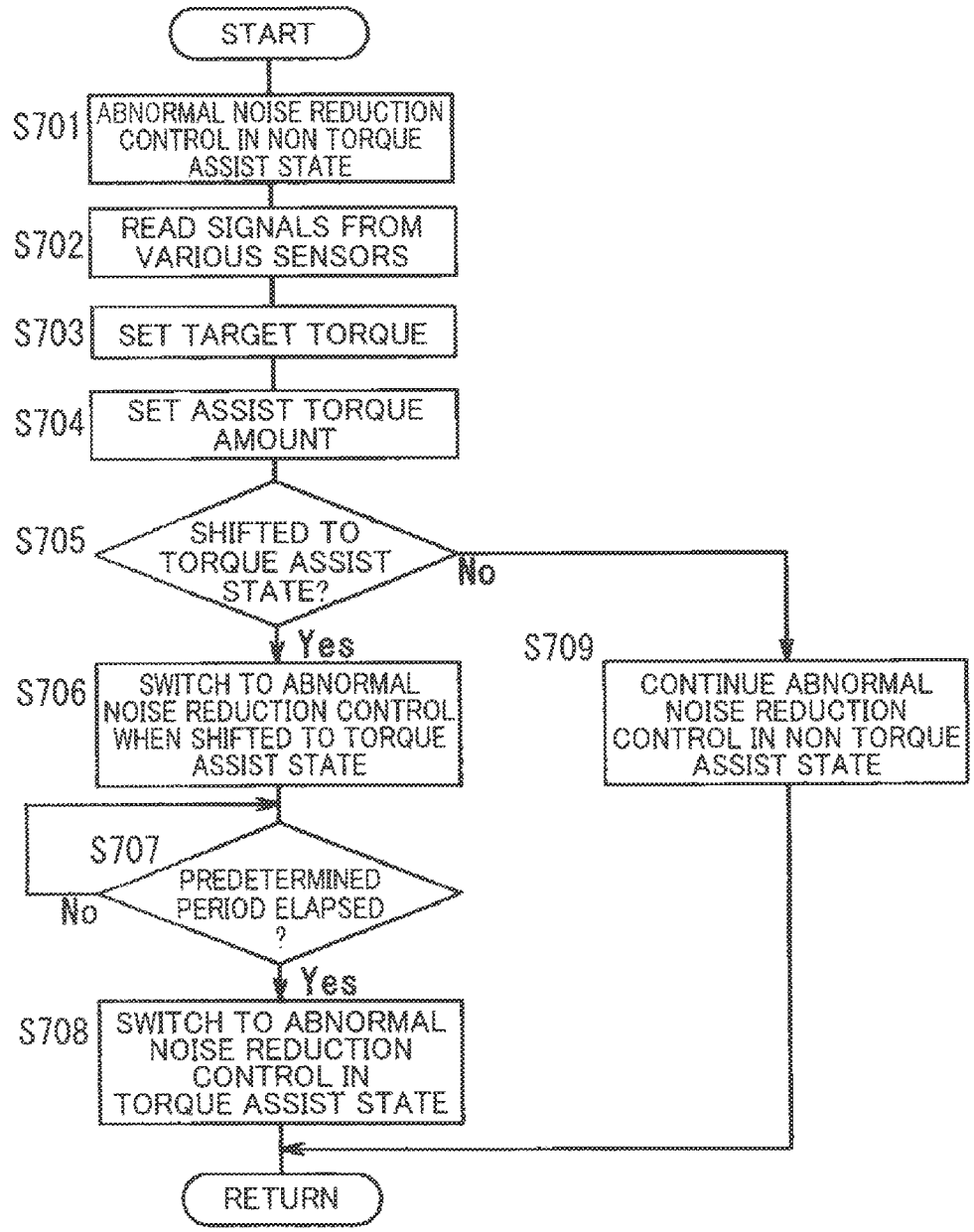

CONTROL DEVICE FOR FOUR-WHEEL DRIVE VEHICLE

BACKGROUND OF THE INVENTION

1. Field of the Invention

The present invention relates to a control device for a four-wheel drive vehicle configured to distribute the output torque of an engine to main drive wheels and to auxiliary drive wheels.

2. Description of the Background Art

As a four-wheel drive vehicle, there is known a vehicle in which a power unit installed in a vehicle body front portion is provided with a power transfer unit for driving rear wheels. The power unit includes an engine, a transmission, and a front wheel differential gear assembly. The power unit drives left and right front wheels as main drive wheels. The power transfer unit is coupled to a propeller shaft extending in the front-rear direction of the vehicle body. A rear wheel differential gear assembly is disposed at a rear end of the propeller shaft so as to transmit power to left and right rear wheels as auxiliary drive wheels, as well as to the left and right front wheels.

An electromagnetic coupling unit capable of changing a transmission torque may be disposed between a propeller shaft and a rear wheel differential gear assembly. Completely coupling the coupling unit switches the vehicle to a four-wheel drive state in which a torque is equally transmitted to front wheels and rear wheels. Completely releasing the coupling of the coupling unit switches the vehicle to a two-wheel drive state in which the driving force is transmitted only to the front wheels. Controlling the degree of coupling of the coupling unit between a completely coupled state and a completely released state makes it possible to adjust torque distribution with respect to the rear wheels depending on the degree of coupling of the coupling unit.

A power transfer unit may employ a pair of bevel gears engageable with each other in order to transmit power from a differential case of a front wheel differential gear assembly whose axis extends in the vehicle width direction to a propeller shaft whose axis extends in the front-rear direction of the vehicle body. Specifically, a bevel gear disposed on the axis of the differential case, and a bevel gear disposed on the axis of the propeller shaft which is always engaged with the bevel gear are used.

The output torque of the engine accompanies torque fluctuation, which is generated at a frequency by intermittent explosions in each of the cylinders. On the other hand, there exists a resonant frequency with respect to torsional vibration in the rotating direction of the shaft in a torque transmission mechanism including a transmission, a front wheel differential gear assembly, a power transfer unit, a propeller shaft, a coupling unit, and a rear wheel differential gear assembly. Therefore, when the frequency of torque fluctuation coincides with the resonant frequency of the torque transmission mechanism, the torsional vibration in the torque transmission mechanism may increase.

In a two-wheel drive state in which the coupling is released and the output torque is transmitted only to the front wheels, a rear wheel torque transmission mechanism that is a region from the paired bevel gears of the power transfer unit to the rear wheels is rotated in a power non-transmission state. If torsional vibration increases in this state, tooth surface separation (a state that gear engagement is released) is likely to occur discontinuously between the paired bevel gears of the power transfer unit of the rear wheel torque transmission mechanism. When the tooth surface separation occurs, abnormal noise by gear rattle is generated. This may be one of the causes of noise in the vehicle.

Meanwhile, there is proposed an idea in which the degree of coupling of a coupling unit is controlled in an operation range of an engine in which a torque transmission mechanism resonates, and a torque larger than torque fluctuation is transmitted to rear wheels by imparting a load to a rear wheel torque transmission mechanism so as to prevent rotation of the rear wheel torque transmission mechanism in a power non-transmission state. According to this configuration, even if torsional vibration increases in the torque transmission mechanism, it is possible to suppress tooth surface separation between a pair of bevel gears of a power transfer unit to thereby suppress generation of abnormal noise by gear rattle.

For instance, Japanese Unexamined Patent Publication No. 2001-277881 discloses a four-wheel drive vehicle provided with an engine, a transmission, a front wheel differential gear assembly, a power transfer unit, a propeller shaft, a coupling unit, and a rear wheel differential gear assembly, in which torque distribution between front wheels and rear wheels is changed in order to suppress generation of abnormal noise (gear rattle) by transmission of abnormal vibration of the engine to a rear wheel torque transmission mechanism when the engine is in an abnormal vibration (knocking noise) generation range.

However, the magnitude of torque fluctuation changes depending on an operation state of the engine. When the torque distribution is controlled without considering a change in torque fluctuation, fuel economy of the engine may be deteriorated due to an increase in drive loss resulting from torque distribution with respect to the rear wheels.

SUMMARY OF THE INVENTION

An object of the invention is to provide a control device for a four-wheel drive vehicle that enables to suppress abnormal noise generation in a torque transmission mechanism, while suppressing deterioration of fuel economy.

In view of the above, a control device for a four-wheel drive vehicle according to an aspect of the invention is a control device for a four-wheel drive vehicle including an engine, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels. The control device is provided with an abnormal noise reduction unit which controls the torque distribution adjustment mechanism to adjust torque distribution with respect to the auxiliary drive wheels in such a manner as to suppress abnormal noise generation when the engine is operated in an abnormal noise generation range in which the torque transmission mechanism is in an abnormal noise generation state. The abnormal noise reduction unit adjusts the torque distribution with respect to the auxiliary drive wheels in accordance with a magnitude of torque fluctuation of the engine.

These and other objects, features and advantages of the present invention will become more apparent upon reading the following detailed description along with the accompanying drawings.

BRIEF DESCRIPTION OF THE DRAWINGS

FIG. 4A is a graph illustrating transmission characteristics of a torque transmission mechanism, torque fluctuation, and torque distribution with respect to rear wheels in a spark ignition mode;

FIG. 4B is a graph illustrating transmission characteristics of the torque transmission mechanism, torque fluctuation, and torque distribution with respect to rear wheels in a compression ignition mode;

FIG. 10 is a time chart illustrating an operation of a four-wheel drive vehicle when the control illustrated in FIG. 9 is executed;

FIG. 12 is a flowchart illustrating abnormal noise reduction control to be executed when the engine control map illustrated in FIG. 11B is applied;

FIG. 16 is a flowchart illustrating abnormal noise reduction control to be executed when the engine is shifted from a non torque assist state to a torque assist state.

DESCRIPTION OF THE PREFERRED EMBODIMENTS

In the following, embodiments of the invention are described referring to the accompanying drawings.

First Embodiment

Figure 1:
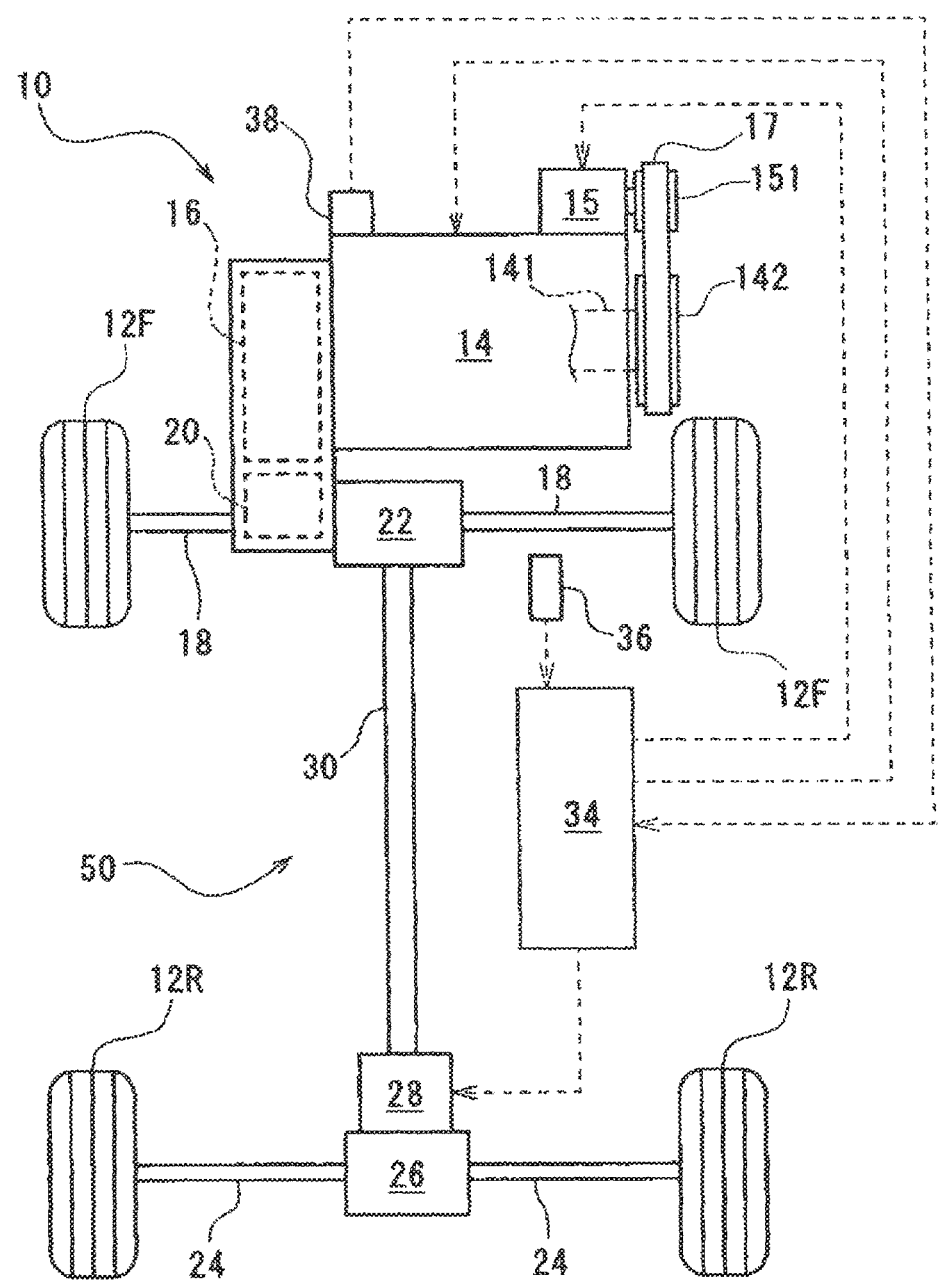
FIG. 1 is a block diagram illustrating a schematic configuration of a four-wheel drive vehicle to which a control device of the invention is applied.

FIG. 1 is a schematic configuration diagram of a four-wheel drive vehicle 10 to which a control device of the invention is applied. The four-wheel drive vehicle 10 includes an engine 14, a transmission 16 which reduces the output torque of the engine 14 at a predetermined reduction ratio, a front wheel differential gear assembly 20 which transmits the output torque reduced by the transmission 16 to left and right front wheels 12F (main drive wheels) via an axle 18, a power transfer unit 22 which extracts the output torque to be transmitted from the front wheel differential gear assembly 20 to left and right rear wheels 12R (auxiliary drive wheels), and a rear wheel differential gear assembly 26 which transmits the output torque from the power transfer unit 22 to the left and right rear wheels 12R via an axle 24.

The engine 14 is a multicylinder engine including multiple cylinders. For instance, the engine 14 is an in-line 4-cylinder engine. In the engine 14, explosions intermittently occur in each of the cylinders, and an output torque T from the engine 14 accompanies a torque fluctuation X by the explosions. Specifically, since the engine 14 is a 4-cylinder engine, the torque fluctuation X is generated at a frequency of two times of the engine speed. The torque fluctuation X is transmitted to the power transfer unit 22 via the transmission 16 or via the front wheel differential gear assembly 20.

Further, the engine 14 is configured to be switchable between a compression ignition mode and a spark ignition mode. In the compression ignition mode, the inside of the cylinders is brought to a high-temperature and high-pressure state by compressing the fuel and air in the cylinders of the engine 14. Self-igniting the fuel at the state makes it possible to substantially simultaneously start combustion in the entirety of a combustion chamber. On the other hand, in the spark ignition mode, the fuel in the combustion chamber is gradually combusted by flame propagation from around ignition plugs. Combustion progresses rapidly in the compression ignition mode, as compared with the spark ignition mode. Therefore, the torque fluctuation X is likely to increase in the compression ignition mode.

The power transfer unit 22 and the rear wheel differential gear assembly 26 are coupled to a propeller shaft 30 extending in the front-rear direction of the vehicle body via a coupling unit 28. Specifically, an output shaft of the power transfer unit 22 is coupled to one end of the propeller shaft 30. The other end of the propeller shaft 30 is coupled to an input shaft of the coupling unit 28. An output shaft of the coupling unit 28 is coupled to an input shaft of the rear wheel differential gear assembly 26.

The power transfer unit 22 transmits power from the front wheel differential gear assembly 20 whose axis extends in the vehicle width direction to the propeller shaft 30 whose axis extends in the front-rear direction of the vehicle body. In view of this, the power transfer unit 22 employs a pair of bevel gears (not illustrated) engagable with each other, specifically, a bevel gear disposed on the axis of the front wheel differential gear assembly 20, and a bevel gear disposed on the axis of the propeller shaft 30.

The coupling unit 28 is, for instance, an electromagnetic coupling unit. With use of the coupling unit 28, it is possible to change the degree of coupling between the propeller shaft 30 and the rear wheel differential gear assembly 26. A torque distribution $T_R$ to be transmitted to the rear wheels 12R is adjusted in accordance with the degree of coupling of the coupling unit 28.

Specifically, complexly coupling the coupling unit 28 makes it possible to switch the vehicle to a four-wheel drive state, in which the output torque T from the engine 14 is equally distributed as a torque distribution $T_F$ to be transmitted to the front wheels 12F, and a torque distribution $T_R$ to be transmitted to the rear wheels 12R. On the other hand, completely releasing the coupling of the coupling unit 28 makes it possible to switch the vehicle to a two-wheel drive state, in which the output torque T is transmitted only to the front wheels 12F. Further, controlling the degree of coupling of the coupling unit 28 between a completely coupled state and a completely released state makes it possible to adjust the torque distribution $T_R$ to be transmitted to the rear wheels 12R in accordance with the degree of coupling of the coupling unit 28. Specifically, controlling the degree of coupling of the coupling unit 28 makes it possible to adjust the torque distribution $T_R$ with respect to the rear wheels 12R in the range of from 0 to 50% of the output torque T from the engine 14.

In the embodiment, the front wheels 12F serve as main drive wheels, and the rear wheels 12R serve as auxiliary drive wheels. The transmission 16, the front wheel differential gear assembly 20, the axle 18, the power transfer unit 22, the propeller shaft 30, the coupling unit 28, the rear wheel differential gear assembly 26, and the axle 24 constitute a torque transmission mechanism 50 which transmits the output torque T of the engine 14 to the front wheels 12F and to the rear wheels 12R. The coupling unit 28 constitutes a torque distribution adjustment mechanism which adjusts the torque distribution with respect to the rear wheels 12R.

There exists a resonant frequency with respect to torsional vibration in the rotating direction of the shaft in the torque transmission mechanism 50. As illustrated in FIG. 4A, in the embodiment, in the torque transmission mechanism 50, there exist resonant points P1 and P2 in a non commonly used range of the engine 14, which is lower than the idle speed $N_{IDLE}$ of the engine 14, and a resonant point P3 in a commonly used range of the engine 14, which is not lower than the idle speed $N_{IDLE}$ of the engine 14.

When the torque distribution $T_R$ with respect to the rear wheels 12R is smaller than the torque fluctuation X, tooth surface separation may occur between the bevel gears, and abnormal noise (gear rattle) may be generated in the power transfer unit 22. In the following description, a range in which the abnormal noise is generated in the torque transmission mechanism 50 is called as an abnormal noise generation range.

As illustrated in FIG. 1, the four-wheel drive vehicle 10 is provided with an acceleration opening degree sensor 36 which detects a stepping amount (acceleration opening degree) of an acceleration pedal input from the driver, an engine speed sensor 38 which detects a rotating speed of the engine 14, and a control device 34 (abnormal noise reduction unit) which controls the operations of the engine 14 and the coupling unit 28.

The control device 34 receives various information such as a signal from the acceleration opening degree sensor 36, and a signal from the engine speed sensor 38. The control device 34 controls the operations of the engine 14 and the coupling unit 28 on the basis of these various information. The control device 34 is constituted of a microcomputer as a main component.

Figure 2:
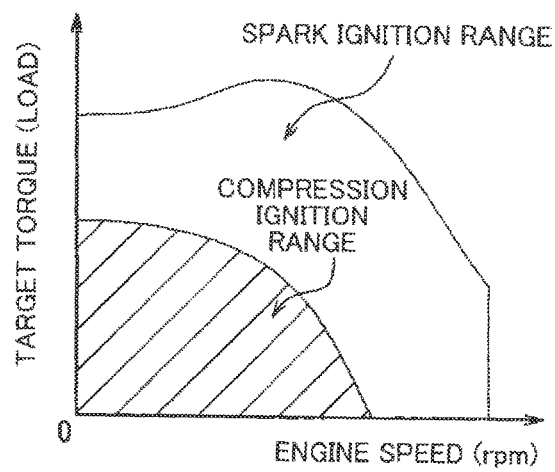
FIG. 2 is a diagram illustrating an example of an engine control map relating to a first embodiment of the invention.

The control device 34 controls the engine 14 in such a manner that an acceleration request from the driver is detected on the basis of a signal from the acceleration opening degree sensor 36, a target torque (engine load) is set, and the target torque is output. Further, as illustrated in FIG. 2, the control device 34 stores an operation mode map in which an operation range is divided into an operation range in the compression ignition mode and an operation range in the spark ignition mode on a torque map illustrating a relationship between an engine speed and a target torque.

The control device 34 controls the operation mode of the engine 14 at the spark ignition mode or at the compression ignition mode on the basis of the operation mode map.

In the embodiment, the operation range in the spark ignition mode is set on the high-rotation and high-load side, and the operation range in the compression ignition mode is set on the low-rotation and low-load side.

Further, the control device 34 controls the degree of coupling of the coupling unit 28 in such a manner that the output torque T from the engine 14 is distributed as a torque distribution $T_F$ with respect to the front wheels 12F, and a torque distribution $T_R$ with respect to the rear wheels 12R. For instance, when acceleration of the vehicle or slip of the front wheel 12F is detected, the control device 34 controls the vehicle in a four-wheel drive state in which the output torque T is distributed to the front wheels 12F and to the rear wheels 12R, and when the vehicle is in a steady running state and/or in a coast running state, the control device 34 controls the vehicle in a two-wheel drive state in which the output torque T is transmitted only to the front wheels 12F.

The control device 34 includes a storage unit which stores an abnormal noise generation range in which the torque transmission mechanism 50 is in an abnormal noise generation state. The abnormal noise generation range is an operation range, in which the resonant frequency of the torque transmission mechanism 50 coincides with the frequency of the torque fluctuation X, which is generated by intermittent explosions in each of the cylinders. In the abnormal noise generation range, the torque fluctuation X from the engine 14 increases by resonance, and torsional vibration in the torque transmission mechanism 50 increases accompanied by the increase in the torque fluctuation X. In this state, when the torque distribution $T_R$ with respect to the rear wheels 12R is smaller than the torque fluctuation X, tooth surface separation may occur between the paired bevel gears in the power transfer unit 22, and abnormal noise (gear rattle) may be generated.

In view of the above, in order to suppress abnormal noise generation in the torque transmission mechanism 50, the control device 34 is provided with a functional unit (abnormal noise reduction unit) which adjusts the torque distribution with respect to the rear wheels 12R in accordance with the magnitude of torque fluctuation of the engine 14. When the engine 14 is operated in the abnormal noise generation range, the abnormal noise reduction unit executes abnormal noise reduction control of adjusting torque distribution with respect to the rear wheels 12R by the coupling unit 28 in such a manner as to suppress abnormal noise generation. Specifically, the abnormal noise reduction control is such that the degree of coupling of the coupling unit 28 is controlled so that at least the torque distribution $T_R$ with respect to the rear wheels 12R is made larger than the torque fluctuation X in the abnormal noise generation range. More specifically, making the torque distribution $T_R$ with respect to the rear wheels 12R larger than the torque fluctuation X makes it possible to prevent tooth surface separation between the paired bevel gears in the power transfer unit 22 due to increased torsional vibration. This makes it possible to suppress generation of abnormal noise (gear rattle).

As described above, whereas in the compression ignition mode, combustion rapidly progresses because combustion starts substantially simultaneously in the entirety of the combustion chamber, in the spark ignition mode, combustion grows by flame propagation from around the ignition plugs. Therefore, the combustion speed in the compression ignition mode is faster than the combustion speed in the spark ignition mode. Consequently, the torque fluctuation X accompanied by the output torque T of the engine 14 is larger in the compression ignition mode than in the spark ignition mode.

In view of the above, the control device 34 (abnormal noise reduction unit) controls the degree of coupling of the coupling unit 28 in such a manner that the torque distribution $T_R$ with respect to the rear wheels 12R in the compression ignition mode is made larger than the torque distribution $T_R$ with respect to the rear wheels 12R in the spark ignition mode. Further, in each of the operation modes, as the engine load (target torque) increases, the torque fluctuation X accompanied by the engine load also increases. In view of the above, the torque distribution $T_R$ with respect to the rear wheels 12R is also made large.

It should be noted that a predetermined torque distribution with respect to the rear wheels 12R is performed when the vehicle is in an acceleration state or by the other requirement such as slip of the front wheel 12F as the main drive wheel. When the torque distribution $T_R$ in the aforementioned condition is larger than the torque distribution $T_R$ required in the abnormal noise reduction control, further torque distribution with respect to the rear wheels 12R is not performed. According to this configuration, it is possible to suppress an increase in drive loss due to unnecessary torque distribution with respect to the rear wheels 12R. This is advantageous in preventing fuel economy deterioration of the engine 14.

Figure 3:
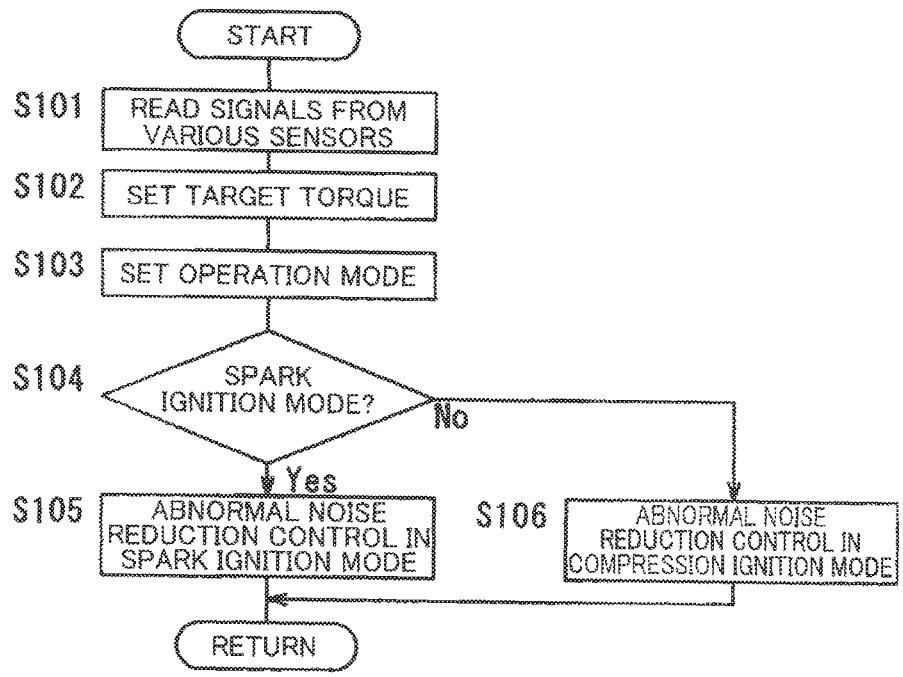
FIG. 3 is a flowchart illustrating abnormal noise reduction control when the vehicle is in a steady state.

Next, abnormal noise reduction control to be executed by the control device 34 when the vehicle is in a steady state is described referring to the flowchart of FIG. 3 and the graphs of FIG. 4A and FIG. 4B. FIG. 3 is a flowchart illustrating a flow of abnormal noise reduction control. FIG. 4A is a graph illustrating a relationship between a torque fluctuation X' and a torque distribution $T_R'$ with respect to the rear wheels 12R in the spark ignition mode. FIG. 4B is a graph illustrating a relationship between a torque fluctuation X and a torque distribution $T_R$ with respect to the rear wheels 12R in the compression ignition mode. In FIG. 4A and FIG. 4B, vibration transmission characteristics of the torque transmission mechanism 50 are also illustrated, and a frequency is converted into an engine speed corresponding to the vibration frequency of the explosion degree of the engine 14.

As illustrated in FIG. 3, the control device 34 reads various information such as a signal from the acceleration opening degree sensor 36, and a signal from the engine speed sensor 38 (Step S101).

Subsequently, the control device 34 sets a target torque on the basis of the signal from the acceleration opening degree sensor 36 (Step S102).

Subsequently, the control device 34 controls the operation mode of the engine 14 at the compression ignition mode or at the spark ignition mode on the basis of the operation mode map, using the target torque set in Step S102 and the speed of the engine 14 (Step S103).

Subsequently, the control device 34 judges whether the operation mode of the engine 14 is the spark ignition mode (Step S104).

In Step S104, when it is judged that the operation mode of the engine 14 is the spark ignition mode (Yes in Step S104), the control device 34 executes abnormal noise reduction control in the spark ignition mode (Step S105).

In this case, as illustrated in FIG. 4A, in the spark ignition mode, the control device 34 increases the torque distribution with respect to the rear wheels 12R in such a manner as to suppress abnormal noise generation in an abnormal noise generation range A including the resonant point P3 of the torque transmission mechanism 50 when the engine 14 is in a commonly used range. Specifically, the control device 34 controls the degree of coupling of the coupling unit 28 so that the torque distribution $T_R'$ larger than the torque fluctuation X' in the spark ignition mode is distributed to the rear wheels 12R.

The torque distribution $T_R$ with respect to the rear wheels 12R may be made larger than the torque fluctuation X. For instance, the torque distribution $T_R$ larger than the torque fluctuation X may be set in the engine speed range including the abnormal noise generation range A and on the low-rotation side than the abnormal noise generation range A. Further, the torque distribution $T_R$ may be set only in the abnormal noise generation range A. Furthermore, the torque distribution $T_R$ may be set in the whole operation range of the engine 14 in such a manner that the torque distribution $T_R$ follows the waveform of the torque fluctuation X.

On the other hand, as illustrated in FIG. 3, in Step S104, when it is judged that the operation mode of the engine 14 is not the spark ignition mode (No in Step S104), the control device 34 executes abnormal noise reduction control in the compression ignition mode (Step S106).

In this case, as illustrated in FIG. 4B, in the compression ignition mode, the control device 34 increases the torque distribution with respect to the rear wheels 12R in such a manner as to suppress abnormal noise generation in the abnormal noise generation range A including a resonant point P of the torque transmission mechanism 50 when the engine 14 is in a commonly used range. Specifically, the control device 34 controls the degree of coupling of the coupling unit 28 so that the torque distribution $T_R$ larger than the torque fluctuation X in the compression ignition mode is distributed to the rear wheels 12R.

As described above, the torque fluctuation X in the compression ignition mode is made larger than the torque fluctuation X' in the spark ignition mode. Therefore, the torque distribution $T_R$ with respect to the rear wheels 12R in the compression ignition mode is larger than the torque distribution $T_R'$ in the spark ignition mode. Further, the torque fluctuation X increases as the load increases in each of the operation modes. In view of the above, the torque distribution $T_R$ with respect to the rear wheels 12R is set to increase, as the load increases.

As described above, according to the embodiment, in the compression ignition mode in which torque fluctuation is large as compared with the spark ignition mode, making the torque distribution with respect to the rear wheels 12R larger than the torque distribution in the spark ignition mode makes it possible to suppress abnormal noise generation in the compression ignition mode. Specifically, changing the torque distribution with respect to the rear wheels 12R between the compression ignition mode and the spark ignition mode makes it possible to suppress abnormal noise generation in the torque transmission mechanism 50 in each of the operation modes, while suppressing fuel economy deterioration of the engine 14.

Next, abnormal noise reduction control to be executed by the control device 34 at the time of switching the operation mode from the spark ignition mode to the compression ignition mode is described. Since the torque fluctuation X is larger in the compression ignition mode than in the spark ignition mode, the torque fluctuation X increase at the time of switching the operation mode from the spark ignition mode to the compression ignition mode.

Abnormal noise reduction control at the time of switching the operation mode from the spark ignition mode to the compression ignition mode is executed with respect to the torque fluctuation X, which increases at the time of switching the operation mode to the compression ignition mode.

Specifically, the control device 34 sets the torque distribution $T_R$ with respect to the rear wheels 12R to increase from the torque distribution in the currently executed spark ignition mode to the torque distribution $T_R$ in the compression ignition mode prior to switching the operation mode from the spark ignition mode to the compression ignition mode. According to this configuration, it is possible to suppress abnormal noise generation in the torque transmission mechanism 50 even if the torque fluctuation X increases at the time of switching the operation mode to the compression ignition mode.

Figure 5:
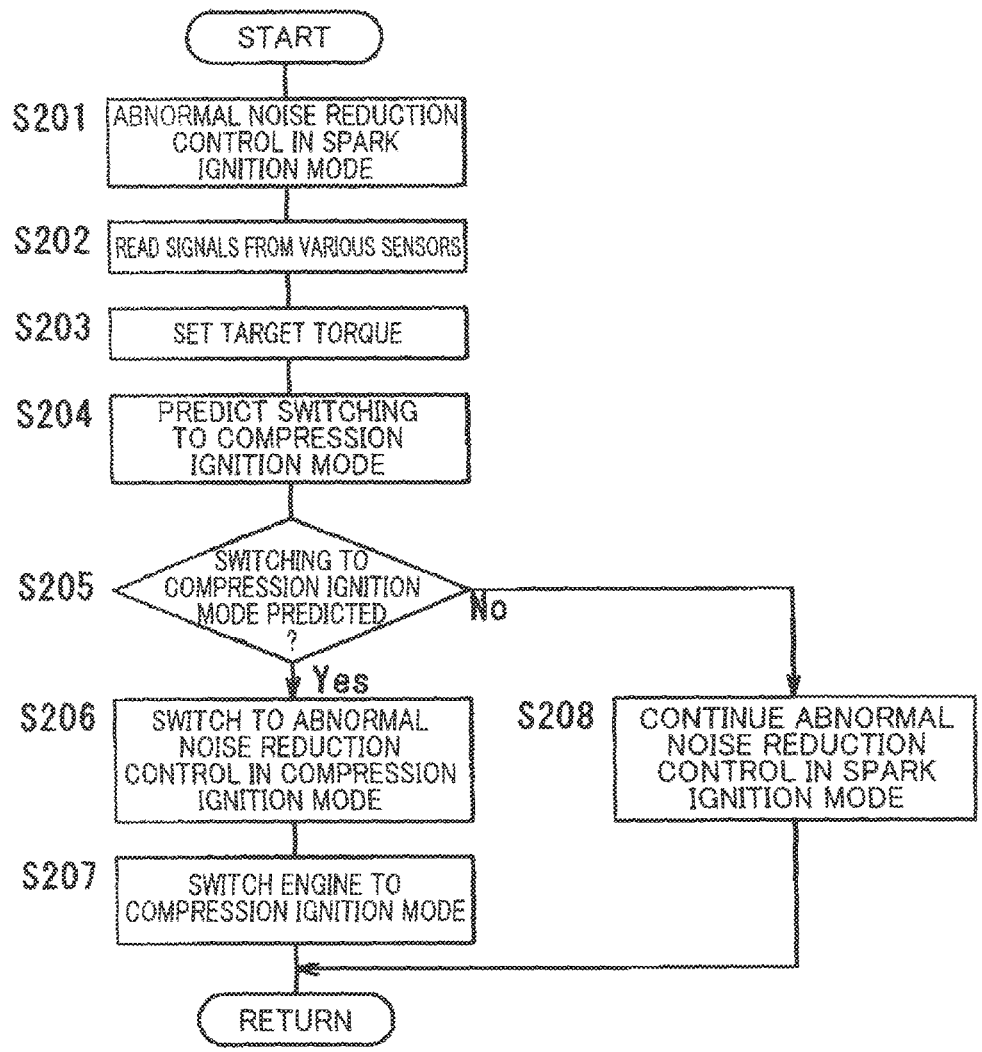
FIG. 5 is a flowchart illustrating abnormal noise reduction control to be executed when the engine is switched from the spark ignition mode to the compression ignition mode.
Figure 6:
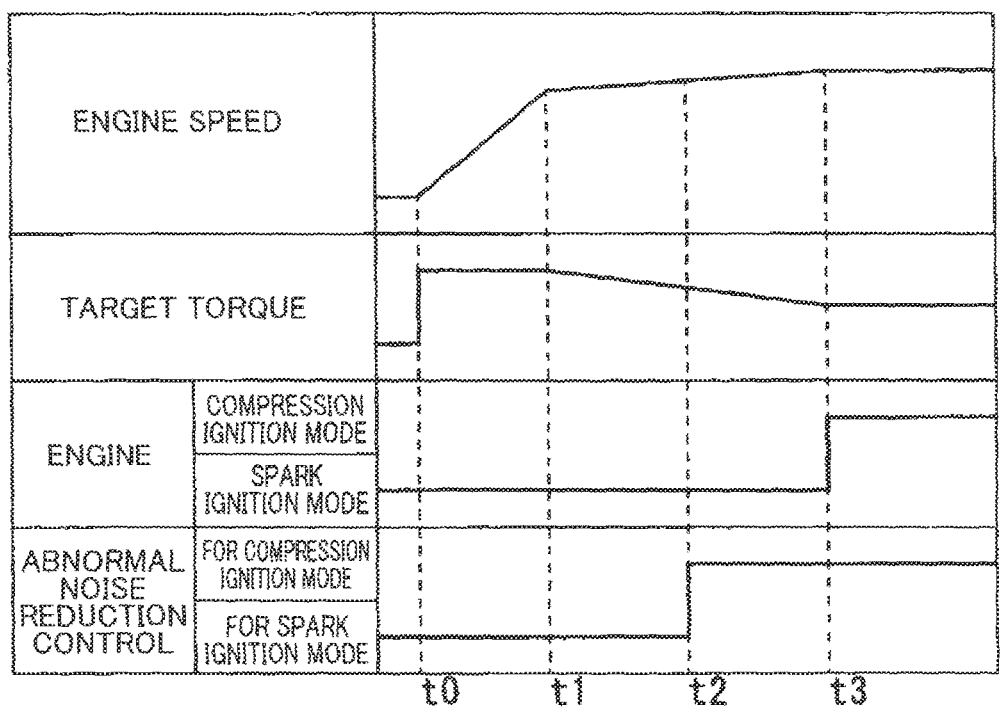
FIG. 6 is a time chart illustrating an operation of a four-wheel drive vehicle when the control illustrated in FIG. 5 is executed.

The abnormal noise reduction control to be executed at the time of switching the operation mode to the compression ignition mode is described referring to the flowchart of FIG. 5 and the time chart of FIG. 6. FIG. 5 is a flowchart illustrating abnormal noise reduction control to be executed at the time of switching the operation mode from the spark ignition mode to the compression ignition mode. FIG. 6 is a time chart illustrating an operation of a four-wheel drive vehicle when the aforementioned control is executed.

As illustrated in FIG. 5, in Step S201, it is assumed that the engine 14 is operated in the spark ignition mode. In this case, abnormal noise reduction control in the spark ignition mode as illustrated in FIG. 4A is executed. In this state, the control device 34 reads various information such as a signal from the acceleration opening degree sensor 36, and a signal from the engine speed sensor 38 (Step S202).

Subsequently, the control device 34 sets a target torque on the basis of the signal from the acceleration opening degree sensor 36 (Step S203). Subsequently, the control device 34 predicts switching from the spark ignition mode to the compression ignition mode on the basis of a change in the target torque (e.g. a speed of change of the engine operation point to be determined from a target torque and an engine speed) (Step S204).

Subsequently, the control device 34 judges whether switching of the operation mode of the engine 14 to the compression ignition mode is predicted (Step S205).

In Step S205, when switching to the compression ignition mode is predicted (Yes in Step S205), the control device 34 switches the abnormal noise reduction control from the abnormal noise reduction control in the currently executed spark ignition mode to the abnormal noise reduction control in the compression ignition mode (Step S206). Thereafter, the control device 34 switches the operation mode of the engine 14 from the spark ignition mode to the compression ignition mode (Step S207).

On the other hand, in Step S205, when switching to the compression ignition mode is not predicted (No in Step S205), the control device 34 continues the abnormal noise reduction control in the spark ignition mode (Step S208).

As illustrated in FIG. 6, after the engine 14 starts acceleration in the spark ignition mode at the point of time t0, when an acceleration request is reduced at the point of time t1 and the target torque is lowered, it is assumed that switching to the compression ignition mode is predicted at the point of time t2 after an elapse of a predetermined period on the basis of the lowering of the target torque. In this case, at the point of time t2, abnormal noise reduction control is switched from the abnormal noise reduction control in the spark ignition mode to the abnormal noise reduction control in the compression ignition mode. Thereafter, at the point of time t3, the operation mode of the engine 14 is switched from the spark ignition mode to the compression ignition mode. Specifically, prior to switching the operation mode of the engine 14 to the compression ignition mode, switching to the abnormal noise reduction control in the compression ignition mode is executed.

According to this configuration, prior to switching the operation mode of the engine 14 from the spark ignition mode to the compression ignition mode, the torque distribution $T_R$ with respect to the rear wheels 12R is increased from the torque distribution in the spark ignition mode to the torque distribution $T_R$ in the compression ignition mode. This makes it possible to prevent shortage of the torque distribution $T_R$ with respect to the rear wheels 12R due to control delay when the operation mode is switched to the compression ignition mode. This is advantageous in suppressing abnormal noise generation in the torque transmission mechanism 50 at the time of switching the operation mode to the compression ignition mode.

As a first modification of abnormal noise reduction control to be executed at the time of switching the operation mode to the compression ignition mode, abnormal noise reduction control in the compression ignition mode may be executed even if the operation mode of the engine 14 is the spark ignition mode. Specifically, when the engine 14 is operated in the abnormal noise generation range, the control device 34 controls the torque distribution $T_R$ with respect to the rear wheels 12R to be always equal to the torque distribution $T_R$ in the compression ignition mode.

Figure 7:
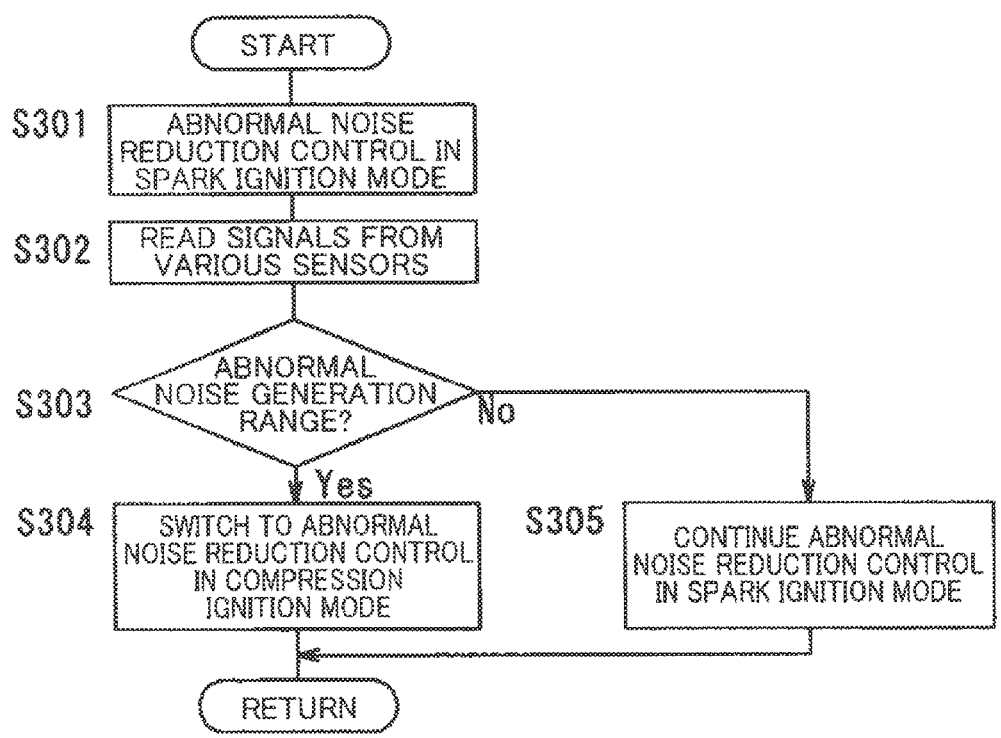
FIG. 7 is a flowchart illustrating abnormal noise reduction control according to a first modification of the first embodiment.
Figure 8:
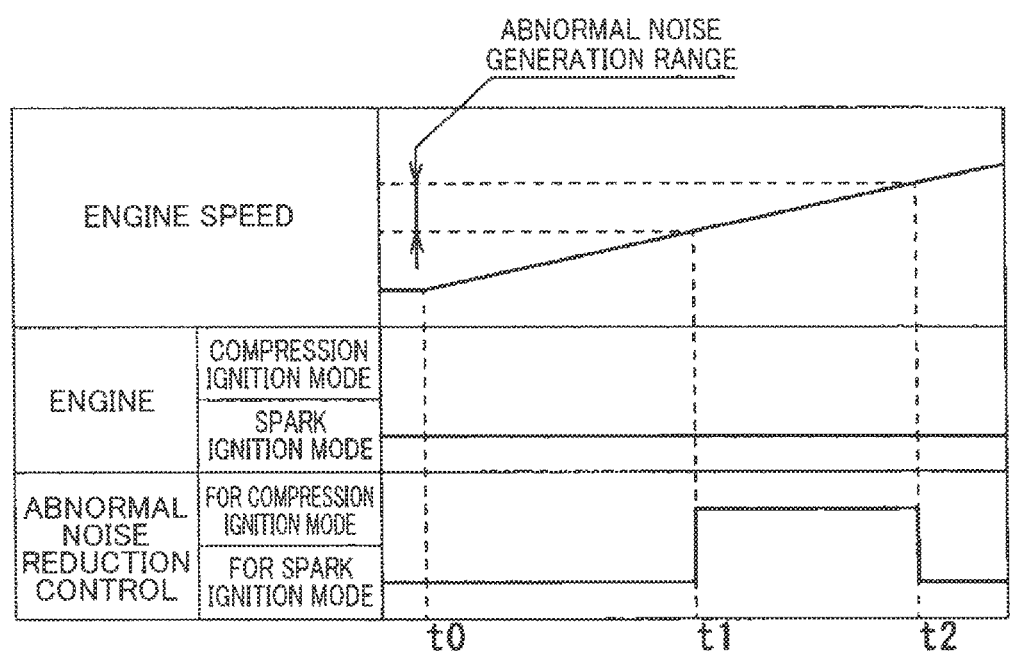
FIG. 8 is a time chart illustrating an operation of a four-wheel drive vehicle when the control illustrated in FIG. 7 is executed.

The first modification of abnormal noise reduction control to be executed at the time of switching the operation mode to the compression ignition mode is described referring to the flowchart of FIG. 7 and the time chart of FIG. 8. FIG. 7 is a flowchart illustrating the first modification of abnormal noise reduction control of the first embodiment at the time of switching the operation mode from the spark ignition mode to the compression ignition mode. FIG. 8 is a time chart illustrating an operation of a four-wheel drive vehicle when the aforementioned control is executed.

As illustrated in FIG. 7, in Step S301, it is assumed that the engine 14 is operated in the spark ignition mode. It is needless to say that abnormal noise reduction control in the spark ignition mode is executed as abnormal noise reduction control. In this state, the control device 34 reads various information such as a signal from the acceleration opening degree sensor 36, and a signal from the engine speed sensor 38 (Step S302).

Subsequently, the control device 34 judges whether the operation range of the engine 14 is the abnormal noise generation range on the basis of the input signal from the engine speed sensor 38 (Step S303).

In Step S303, when it is judged that the engine 14 is operated in the abnormal noise generation range (Yes in Step S303), the control device 34 switches the abnormal noise reduction control from the abnormal noise reduction control in the currently executed spark ignition mode to the abnormal noise reduction control in the compression ignition mode (Step S304).

On the other hand, in Step S303, when it is judged that the engine 14 is not operated in the abnormal noise generation range (No in Step S303), the control device 34 continues the abnormal noise reduction control in the spark ignition mode (Step S305).

As illustrated in FIG. 8, it is assumed that the operation of the engine 14 is started in the abnormal noise generation range at the point of time t1 in a state that the operation of the engine 14 in the spark ignition mode is continued from the point of time t0. In this case, the control device 34 switches the abnormal noise reduction control from the abnormal noise reduction control in the spark ignition mode to the abnormal noise reduction control in the compression ignition mode. Then, at the point of time t2, when the operation of the engine 14 escapes from the abnormal noise generation range, the control device 34 returns the abnormal noise reduction control from the abnormal noise reduction control in the compression ignition mode to the abnormal noise reduction control in the spark ignition mode.

According to this configuration, in the abnormal noise generation range, the torque distribution $T_R$ with respect to the rear wheels 12R is always increased from the torque distribution in the spark ignition mode to the torque distribution $T_R$ in the compression ignition mode even if the engine 14 is in the spark ignition mode. This eliminates the need of increasing the torque distribution $T_R$ at the time of switching the operation mode from the spark ignition mode to the compression ignition mode. This makes it possible to suppress abnormal noise generation in the torque transmission mechanism 50 at the time of switching the operation mode to the compression ignition mode without a delay of increasing the torque distribution $T_R$ with respect to the rear wheels 12R due to control delay.

Next, second modification of abnormal noise reduction control to be executed at the time of switching the operation mode to the compression ignition mode is described. In the second modification, the control device 34 controls the torque distribution $T_R$ with respect to the rear wheels 12R to further increase from the torque distribution $T_R$ for abnormal noise reduction control when the vehicle is in an acceleration state, and to reduce to the torque distribution $T_R$ for abnormal noise reduction control when the vehicle is shifted from an acceleration state to a steady state. Further, when switching of the operation mode from the spark ignition mode to the compression ignition mode is predicted when the vehicle is shifted from an acceleration state in the spark ignition mode to a steady state, the control device 34 controls the degree of coupling of the coupling unit 28 in such a manner as to suppress reduction of the torque distribution $T_R$ with respect to the rear wheels 12R.

Figure 9:
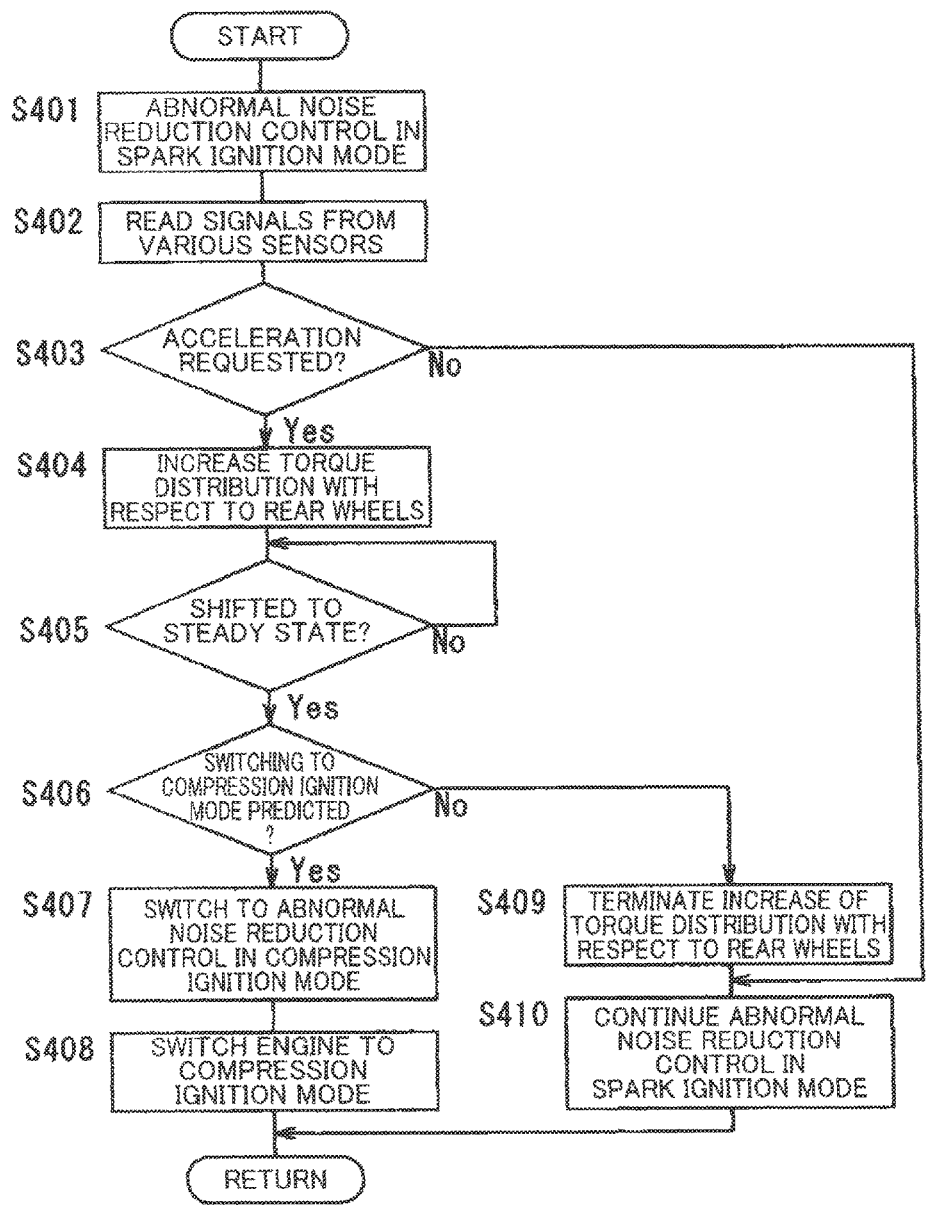
FIG. 9 is a flowchart illustrating abnormal noise reduction control according to a second modification of the first embodiment.

The second modification of abnormal noise reduction control to be executed at the time of switching the operation mode to the compression ignition mode is described referring to the flowchart of FIG. 9 and the time chart of FIG. 10. FIG. 9 is a flowchart illustrating the second modification of abnormal noise reduction control of the first embodiment at the time of switching the operation mode from the spark ignition mode to the compression ignition mode. FIG. 10 is a time chart illustrating an operation of a four-wheel drive vehicle when the aforementioned control is executed.

As illustrated in FIG. 9, in Step S401, it is assumed that the engine 14 is operated in the operation range at the spark ignition mode in the operation mode map (see FIG. 2). As the abnormal noise reduction control, the abnormal noise reduction control in the spark ignition mode is executed. In this state, the control device 34 reads various information such as a signal from the acceleration opening degree sensor 36, and a signal from the engine speed sensor 38 (Step S402).

Subsequently, the control device 34 judges the presence or absence of an acceleration request from the driver on the basis of the signal from the acceleration opening degree sensor 36 (Step S403).

In Step S403, when it is judged that an acceleration request is present (Yes in Step S403), the control device 34 controls the degree of coupling of the coupling unit 28 in such a manner as to increase the torque distribution with respect to the rear wheels 12R in response to an increase in the output torque from the engine 14 (Step S404).

Subsequently, the control device 34 judges whether the acceleration request is terminated, in other words, whether the vehicle is shifted to a steady running state (or a coast running state) on the basis of the signal from the acceleration opening degree sensor 36 (Step S405).

In Step S405, when it is judged that the vehicle is shifted to a steady running state (or a coast running state) (Yes in Step S405), the control device 34 predicts switching of the operation mode from the spark ignition mode to the compression ignition mode on the basis of the input signal from the acceleration opening degree sensor 36 (Step S406).

In Step S406, when switching to the compression ignition mode is predicted (Yes in Step S406), the control device 34 suppresses reduction of the torque distribution $T_R$ with respect to the rear wheels 12R, unlike the conventional art in which the torque distribution $T_R$ with respect to the rear wheels 12R is reduced (returned) to the torque distribution $T_R$ in the spark ignition mode. Subsequently, the control device 34 switches the abnormal noise reduction control from the abnormal noise reduction control in the spark ignition mode to the abnormal noise reduction control in the compression ignition mode, while suppressing reduction of the torque distribution as described above (Step S407). Thereafter, the control device 34 switches the operation mode of the engine 14 to the compression ignition mode (Step S408).

On the other hand, in Step S403, when it is judged that there is no acceleration request (No in Step S403), the control device 34 continues the abnormal noise reduction control in the spark ignition mode.

Further, in Step S406, when switching to the compression ignition mode is not predicted (No in Step S406), the control device 34 terminates increasing the torque distribution with respect to the rear wheels 12R when the vehicle is in an acceleration state (Step S409), and returns the abnormal noise reduction control to the abnormal noise reduction control in the spark ignition mode (Step S410).

As illustrated in FIG. 10, after the engine 14 starts acceleration in the spark ignition mode at the point of time t0, when the acceleration request is reduced at the point of time t1 and the target torque is lowered, it is assumed that switching to the compression ignition mode is predicted at the point of time t2 after an elapse of a predetermined period on the basis of the lowering of the target torque. In this case, the torque distribution $T_R$ with respect to the rear wheels 12R is increased from the point of time t0 on the basis of the acceleration request, and starts to decrease accompanied by lowering of the target torque at the point of time t1. Then, at the point of time t2, when switching of the operation mode of the engine 14 to the compression ignition mode is predicted, the control device 34 suppresses reduction of the torque distribution $T_R$ with respect to the rear wheels 12R. Then, at the point of time t3, the control device 34 switches the operation mode of the engine 14 from the spark ignition mode to the compression ignition mode, and switches the abnormal noise reduction control from the abnormal noise reduction control in the spark ignition mode to the abnormal noise reduction control in the compression ignition mode.

According to this configuration, when switching from the spark ignition mode to the compression ignition mode is predicted at the time of shifting from an acceleration state to a steady state, it is possible to suppress reduction of the torque distribution with respect to the rear wheels 12R to the torque distribution for abnormal noise reduction control in the spark ignition mode. Thus, it is possible to switch the operation mode to the compression ignition mode in a state that the torque distribution with respect to the rear wheels 12R is kept higher than the torque distribution in the spark ignition mode. This is advantageous in suppressing abnormal noise generation in the torque transmission mechanism 50 at the time of switching the operation mode.

Figure 11A:
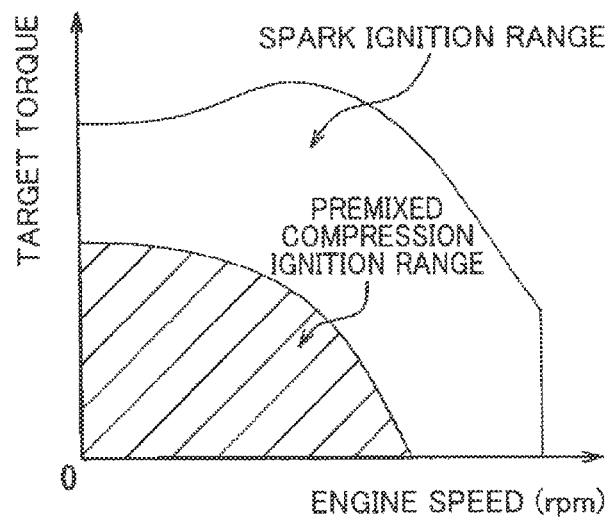
FIG. 11A is a diagram illustrating a modification of the engine control map.
Figure 11B:
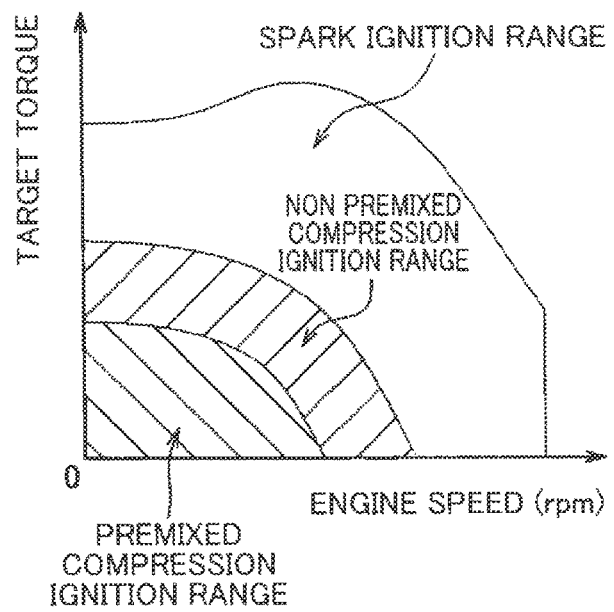
FIG. 11B is a diagram illustrating another modification of the engine control map.

In the embodiment, the operation mode of the engine 14 is switchable between the spark ignition mode and the compression ignition mode. The invention is not limited to the above. For instance, as illustrated in FIG. 11A, the compression ignition mode may be compression ignition by premixed compression ignition. Further alternatively, as illustrated in FIG. 11B, the compression ignition mode may be divided into compression ignition by premixed compression ignition, and compression ignition by non-premixed compression ignition.

In the compression ignition mode, compression ignition by premixed compression ignition is such that a fuel-air pre-mixture is subjected to self-ignition compression. Therefore, a fuel-air mixture existing substantially uniformly in the entirety of the combustion chamber substantially simultaneously starts combustion in the entirety of the combustion chamber. Thus, in the premixed compression ignition, combustion rapidly progresses, as compared with the non premixed compression ignition. This promotes an increase in torque fluctuation.

In view of the above, in the abnormal noise reduction control in the compression ignition mode, it is desirable for the control device 34 to control the degree of coupling of the coupling unit 28 in such a manner that the torque distribution $T_R$ with respect to the rear wheels 12R in the premixed compression ignition mode is made larger than the torque distribution $T_R$ with respect to the rear wheels 12R in the non-premixed compression ignition mode.

In order to satisfy the aforementioned requirement, the control device 34 controls the degree of coupling of the coupling unit 28 in accordance with each of the operation modes in such a manner that the torque distribution $T_R$ in the non-premixed compression ignition mode is made larger than the torque distribution $T_R$ in the spark ignition mode, and that the torque distribution $T_R$ in the premixed compression ignition mode is further larger than the torque distribution $T_R$ in the non-premised compression ignition mode.

FIG. 12 is a flowchart illustrating abnormal noise reduction control to be executed when the engine control map illustrated in FIG. 11B is applied. As illustrated in FIG. 12, the control device 34 reads various information such as a signal from the acceleration opening degree sensor 36, and a signal from the engine speed sensor 38 (Step S501).

Subsequently, the control device 34 sets the target torque on the basis of the signal from the acceleration opening degree sensor 36 (Step S502).

Subsequently, the control device 34 controls the operation mode of the engine 14 at the spark ignition mode, the non-premixed compression ignition mode, or the premixed compression ignition mode on the basis of the operation mode map, using the target torque set in Step S502 and the speed of the engine 14 (Step S503).

Subsequently, the control device 34 judges whether the operation mode of the engine 14 is the spark ignition mode (Step S504).

In Step S504, when it is judged that the operation mode of the engine 14 is the spark ignition mode (Yes in Step S504), the control device 34 executes the abnormal noise reduction control in the spark ignition mode (Step S505).

On the other hand, in Step S504, when it is judged that the operation mode of the engine 14 is not the spark ignition mode (No in Step S504), the control device 34 judges whether the operation mode of the engine 14 is the non-premixed compression ignition mode (Step S506).

In Step S506, when it is judged that the operation mode of the engine 14 is the non-premixed compression ignition mode (Yes in Step S506), the control device 34 executes the abnormal noise reduction control in the non-premixed compression ignition mode (Step S507).

On the other hand, in Step S506, when it is judged that the operation mode of the engine 14 is not the non-premixed compression ignition mode (No in Step S506), the control device 34 executes the abnormal noise reduction control in the premixed compression ignition mode (Step S508).

According to this configuration, in the engine configured such that the operation mode is switchable between the spark ignition mode, the non-premixed compression ignition mode, and the premixed compression ignition mode, it is possible to execute the abnormal reduction control in accordance with each of the operation modes. This makes it possible to suppress unnecessary torque distribution $T_R$ with respect to the rear wheels 12R, while suppressing abnormal noise generation in the torque transmission mechanism 50. This is advantageous in suppressing fuel economy deterioration of the engine 14.

In the embodiment, a four-wheel drive vehicle is provided with the front wheels 12F as main drive wheels, and the rear wheels 12R as auxiliary drive wheels. Alternatively, the embodiment is also applicable to a four-wheel drive vehicle provided with rear wheels 12R as main drive wheels, and front wheels 12F as auxiliary drive wheels.

As described above, according to the control device 34 for a four-wheel drive vehicle of the first embodiment, with use of the engine 14 configured to be switchable between the compression ignition mode and the spark ignition mode, it is possible to suppress abnormal noise generation in the torque transmission mechanism 50 in the spark ignition mode and in the compression ignition mode, while suppressing fuel economy deterioration.

Second Embodiment

Although illustration is omitted in the first embodiment, referring to FIG. 1, the four-wheel drive vehicle 10 is provided with a drive motor 15 which imparts an assist torque to the engine 14. In the first embodiment, the control device 34 (abnormal noise reduction unit) adjusts torque distribution with respect to the rear wheels 12R in accordance with the magnitude of torque fluctuation of the engine 14 in order to control a change in torque fluctuation accompanied by mode switching between the spark ignition mode and the compression ignition mode. In the second embodiment, a control device 34 copes with a change in torque fluctuation accompanied by a degree of torque assist by the drive motor 15.

As illustrated in FIG. 1, a drive pulley 151 is mounted on the output shaft of the drive motor 15, and a crank pulley 142 is mounted on a crank shaft 141 of the engine 14. A winding transmission member 17 is wound between the drive pulley 151 and the crank pulley 142. When the drive motor 15 is driven to rotate, the crank shaft 141 is driven to rotate via the drive pulley 151, the winding transmission member 17, and the crank pulley 142.

Specifically, when the drive motor 15 is driven to rotate, an assist torque is imparted from the drive motor 15 to the engine 14. In other words, when an output torque T0 from the engine 14 is constant, a drive torque T1 generated in the engine 14 in a torque assist state by the drive motor 15 is made smaller than a drive torque T1' generated in the engine 14 when the engine 14 is in a non torque assist state, by the amount corresponding to the assist torque to be imparted from the drive motor 15.

A torque fluctuation X accompanied by the drive torque T1 generated in the engine 14 increases, as a drive torque T1 increases. The torque fluctuation X decreases, as the drive torque T1 decreases. Therefore, the torque fluctuation X accompanied by the drive torque T1 in a torque assist state is made smaller than the torque fluctuation X' accompanied by the drive torque T1' in a non torque assist state.

Figure 13:
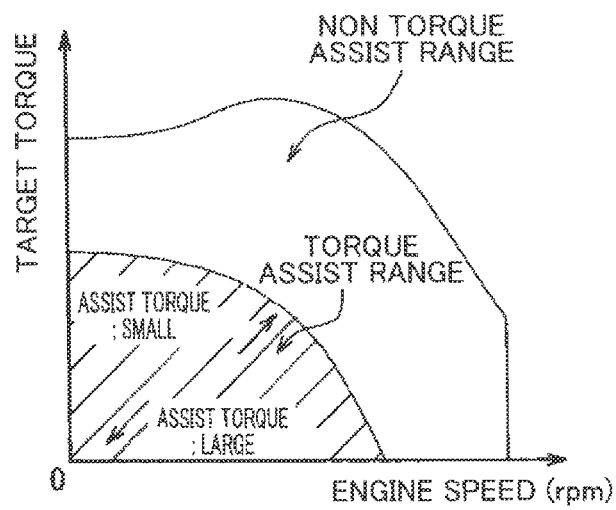
FIG. 13 is a diagram illustrating an example of an engine control map relating to a second embodiment of the invention.

As well as the first embodiment, the control device 34 detects an acceleration request from the driver on the basis of a signal from an acceleration opening degree sensor 36, sets a target torque (engine load), and controls the engine 14 to output the target torque. In the second embodiment, as illustrated in FIG. 13, the control device 34 stores an assist torque map, in which an assist torque amount by the drive motor 15 is set on a torque map illustrating a relationship between an engine speed and a target torque. The control device 34 controls the drive torque T1 by the engine 14 and a drive torque T2 by the drive motor 15 on the basis of the assist torque map.

In the embodiment, a non torque assist range in which the assist torque amount is zero is set on the high-rotation and high-load side, and a torque assist range in which an assist torque is imparted is set on the low-rotation and low-load side. Further, in the torque assist range, the assist torque amount (or the assist torque rate) is set to increase toward the low-rotation and low-load side.

The control device 34 in the second embodiment is the same as the first embodiment in that the degree of coupling of a coupling unit 28 is controlled in such a manner as to distribute an output torque T from the engine 14 as a torque distribution $T_F$ with respect to front wheels 12F and a torque distribution $T_R$ with respect to rear wheels 12R, and that abnormal noise reduction control is executed when the engine 14 is operated in an abnormal noise generation range in order to suppress abnormal noise generation in a torque transmission mechanism 50.

Further, the control device 34 (abnormal noise reduction unit) controls the degree of coupling of the coupling unit 28 in such a manner that the degree of increase of the torque distribution $T_R$ with respect to the rear wheels 12R decreases, as the assist torque amount by the drive motor 15 increases. In other words, the torque distribution $T_R$ with respect to the rear wheels 12R in a torque assist state is made small, as compared with the torque distribution $T_R$ with respect to the rear wheels 12R in a non torque assist state. Further, in the torque assist state, the torque distribution $T_R$ with respect to the rear wheels 12R decreases, as the assist torque amount by the drive motor 15 increases.

It should be noted that a predetermined torque distribution with respect to the rear wheels 12R is performed when the vehicle is in an acceleration state or by the other requirement such as slip of the front wheel 12F as the main drive wheel. When the torque distribution $T_R$ in the aforementioned condition is larger than the torque distribution $T_R$ required in the abnormal noise reduction control, further torque distribution with respect to the rear wheels 12R is not performed. According to this configuration, it is possible to suppress an increase in drive loss due to unnecessary torque distribution with respect to the rear wheels 12R. This is advantageous in preventing fuel economy deterioration of the engine 14.

Figure 14:
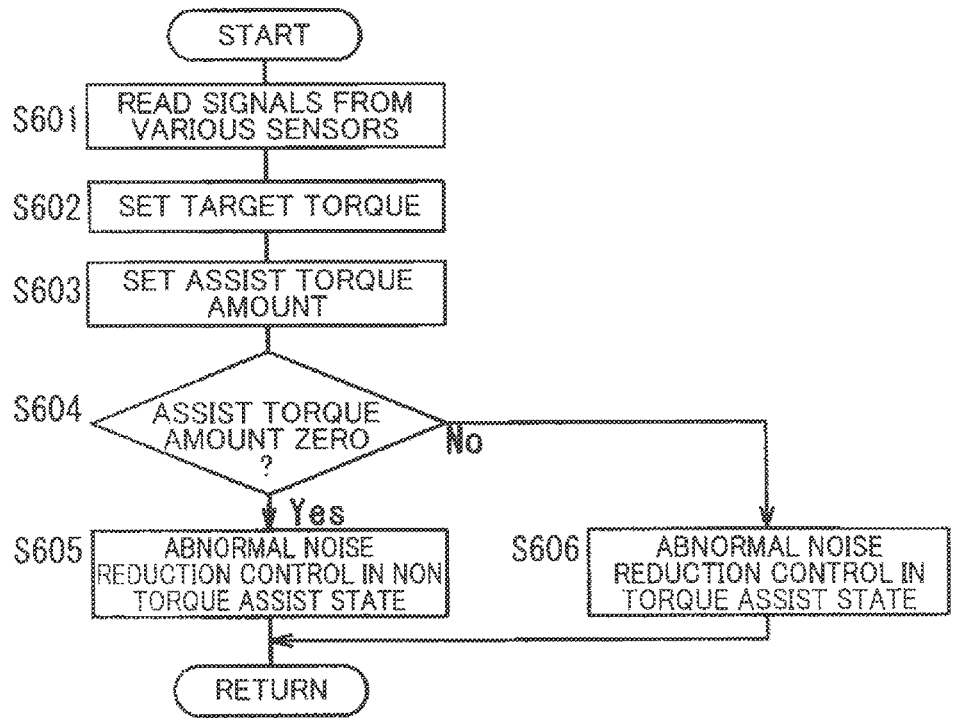
FIG. 14 is a flowchart illustrating abnormal noise reduction control to be executed when the vehicle is in a steady state.
Figure 15A:
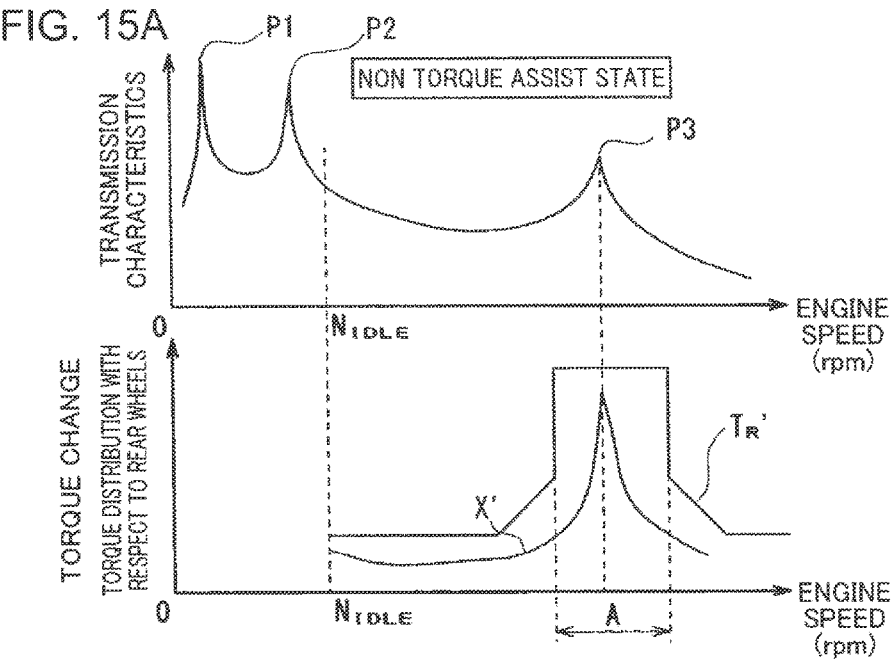
FIG. 15A is a graph illustrating transmission characteristics of a torque transmission mechanism, torque fluctuation, and torque distribution with respect to rear wheels in a non torque assist state.
Figure 15B:
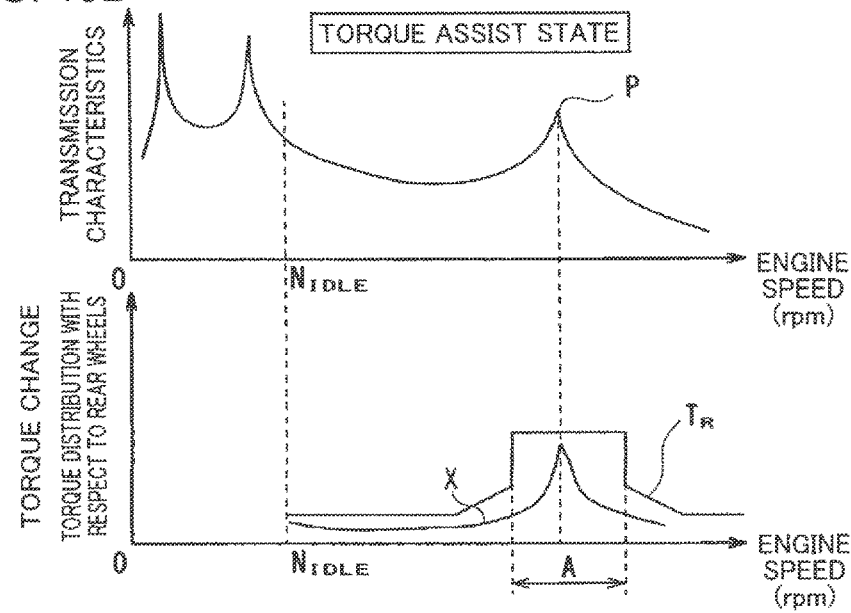
FIG. 15B is a graph illustrating transmission characteristics of the torque transmission mechanism, torque fluctuation, and torque distribution with respect to rear wheels in a torque assist state.

Next, abnormal noise reduction control to be executed by the control device 34 when the vehicle is in a steady state (in other words, when the engine 14 is in a non torque assist state or in a torque assist state) is described referring to the flowchart of FIG. 14, and the graphs of FIG. 15A and FIG. 15B.

FIG. 14 is a flowchart illustrating a flow of abnormal noise reduction control. FIG. 15A is a graph illustrating a relationship between a torque fluctuation X' and a torque distribution $T_R'$ with respect to the rear wheels 12 in a non torque assist state. FIG. 15B is a graph illustrating a relationship between a torque fluctuation X and a torque distribution $T_R$ with respect to the rear wheels 12R in a torque assist state. In FIG. 15A and FIG. 15B, vibration transmission characteristics of the torque transmission mechanism 50 are also illustrated, and a frequency is converted into an engine speed corresponding to the vibration frequency of the explosion degree of the engine 14.

As illustrated in FIG. 14, the control device 34 reads various information such as a signal from the acceleration opening degree sensor 36, and a signal from an engine speed sensor 38 (Step S601).

Subsequently, the control device 34 sets a target torque on the basis of the signal from the acceleration opening degree sensor 36 (Step S602).

Subsequently, the control device 34 sets a torque assist amount by the drive motor 15 on the basis of the torque assist map, using the target torque set in Step S602 and the speed of the engine 14 (Step S603).

Subsequently, the control device 34 judges whether the torque assist amount set in Step S603 is zero, in other words, whether the operation range of the engine 14 is the non torque assist range (Step S604).

In Step S604, when it is judged that the operation range of the engine 14 is the non torque assist range (Yes in Step S604), the control device 34 executes abnormal noise reduction control in the non torque assist state (Step S605).

In this case, as illustrated in FIG. 15A, when the engine 14 is in the non torque assist state, the control device 34 increases the torque distribution with respect to the rear wheels 12R in such a manner as to suppress abnormal noise generation in an abnormal noise generation range A including a resonant point P3 of the torque transmission mechanism 50 when the engine 14 is in a commonly used range. Specifically, the control device 34 controls the degree of coupling of the coupling unit 28 in such a manner that the torque distribution $T_R'$ larger than the torque fluctuation X' in the non torque assist state is distributed to the rear wheels 12R.

The torque distribution $T_R$ with respect to the rear wheels 12R may be made larger than the torque fluctuation X. For instance, the torque distribution $T_R$ larger than the torque fluctuation X may be set in the engine speed range including the abnormal noise generation range A and on the low rotation side than the abnormal noise generation range A. Alternatively, the torque distribution $T_R$ may be set only in the abnormal noise generation range A. Further alternatively, the torque distribution $T_R$ may be set in the whole operation range of the engine 14 in such a manner that the torque distribution $T_R$ follows the waveform of the torque fluctuation X.

On the other hand, as illustrated in FIG. 14, in Step S604, when it is judged that the operation range of the engine 14 is not the non torque assist range (No in Step S604), the control device 34 executes abnormal noise reduction control in the torque assist state (Step S606).

In this case, as illustrated in FIG. 15B, when the engine 14 is in the torque assist state, the control device 34 increases the torque distribution with respect to the rear wheels 12R in such a manner as to suppress abnormal noise generation in the abnormal noise generation range A including a resonant point P of the torque transmission mechanism 50 when the engine 14 is in a commonly used range. Specifically, the control device 34 controls the degree of coupling of the coupling unit 28 in such a manner that the torque distribution $T_R$ larger than the torque fluctuation X in the torque assist state is distributed to the rear wheels 12R.

The torque fluctuation X in the torque assist state is smaller than the torque fluctuation X' in the non assist torque state due to decrease of a drive torque generated in the engine 14 by an assist torque imparted from the drive motor 15. Therefore, the torque distribution $T_R$ with respect to the rear wheels 12R in the torque assist state is smaller than the torque distribution $T_R'$ in the non torque assist state. Further, the torque fluctuation X decreases accompanied by decrease of the drive torque T1 generated in the engine 14, as the assist torque amount increases. Therefore, the torque distribution $T_R$ with respect to the rear wheels 12R also decreases.

Specifically, the degree of increase of the torque distribution $T_R$ with respect to the rear wheels 12 by abnormal noise reduction control is such that the degree of increase is small in the torque assist state, as compared with the non torque assist state, and that the degree of increase is lowered, as the assist torque to be imparted from the drive motor 15 increases.

As described above, according to the embodiment, the drive torque T1 generated in the engine 14 decreases, as the assist torque to be imparted from the drive motor 15 increases, and the torque fluctuation X of the engine 14 decreases, as the drive torque T1 decreases. This makes it possible to suppress abnormal noise generation in the torque transmission mechanism 50 even if the torque distribution $T_R$ with respect to the rear wheels 12R is decreased, as the drive torque T2 to be imparted from the drive motor 15 is increased. This is advantageous in suppressing fuel economy deterioration of the engine 14.

Next, abnormal noise reduction control to be executed by the control device 34 at the time of shifting from the non torque assist state to the torque assist state is described. When the engine 14 is shifted from the non torque assist state to the torque assist state, the torque fluctuation X to be output from the engine 14 may increase due to start of an operation of the drive motor 15. For instance, when the drive motor 15 is operated, the torque fluctuation X may increase for a predetermined period, without smooth shifting to the torque assist state due to a sharp change in the tension force of the winding transmission member 17.

When the abnormal noise reduction control is executed at the time of shifting from the non torque assist state to the torque assist state, the torque distribution $T_R$ with respect to the rear wheels 12R is temporarily made larger than a torque distribution $T_R$ (first torque distribution), which is set in advance as a torque distribution in the torque assist state. This makes it possible to securely suppress abnormal noise generation in the torque transmission mechanism 50 even if the torque fluctuation X is increased at the time of shifting to the torque assist state.

Figure 17:
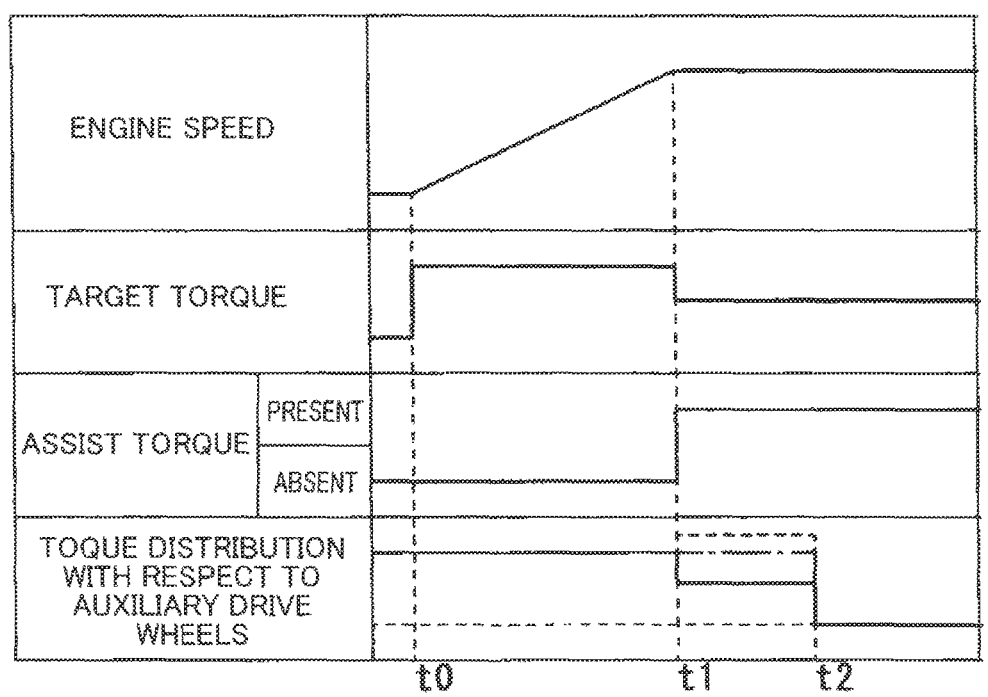
FIG. 17 is a time chart illustrating an operation of a four-wheel drive vehicle when the control illustrated in FIG. 16 is executed.

Abnormal noise reduction control to be executed at the time of shifting to the torque assist state is described referring to the flowchart of FIG. 16 and the time chart of FIG. 17. FIG. 16 is a flowchart illustrating abnormal noise reduction control to be executed when the engine is shifted from the non torque assist state to the torque assist state. FIG. 17 is a time chart illustrating an operation of a four-wheel drive vehicle when the aforementioned control is executed.

As illustrated in FIG. 16, in Step S701, it is assumed that the engine 14 is operated in the non torque assist state. In this state, abnormal noise reduction control in the non torque assist state as illustrated in FIG. 15A is executed. In this state, the control device 34 reads various information such as a signal from the acceleration opening degree sensor 36, and a signal from the engine speed sensor 38 (Step S702).

Subsequently, the control device 34 sets a target torque on the basis of the signal from the acceleration opening degree sensor 36 (Step S703). Subsequently, the control device 34 sets an assist torque amount by the drive motor 15 on the basis of the assist torque map, using the target torque and the speed of the engine 14 (Step S704).

Subsequently, the control device 34 judges whether the engine 14 is to be shifted to the torque assist state, in other words, judges whether the assist torque amount is set in Step S704 (Step S705).

In Step S705, when it is judged that the engine 14 is shifted to the torque assist state (Yes in Step S705), the control device 34 switches the abnormal noise reduction control from the abnormal noise reduction control in the non torque assist state to the abnormal noise reduction control in the torque assist state (Step S706). Specifically, the control device 34 makes the torque distribution $T_R$ with respect to the rear wheels 12R larger than the torque distribution $T_R$ in the torque assist state.

When the predetermined period has elapsed (Step S707), the control device 34 switches the abnormal noise reduction control from the abnormal noise reduction control at the time of shifting to the abnormal noise reduction control in the torque assist state (Step S708). The predetermined period is a period during which an increase in torque fluctuation at the time of shifting is cancelled. The predetermined period may be set in advance by e.g. a timer, or may be a period such that an increase in the torque fluctuation X is cancelled by actually measuring the torque fluctuation X.

As illustrated in FIG. 17, it is assumed that the engine 14 is accelerated in the non torque assist state at the point of time t0, the target torque is reduced at the point of time t1, and the engine 14 is shifted to the torque assist state. In this case, the control device 34 temporarily controls the torque distribution $T_R$ with respect to the rear wheels 12R to increase to the torque distribution $T_R$, which is made larger than the torque distribution $T_R$ which is set in advance as a torque distribution in the torque assist state.

The torque distribution $T_R$ in this state may be larger than the torque distribution $T_R$ in the torque assist state. For instance, as illustrated by the broken line in FIG. 17, at the point of time t1, the torque distribution may be made larger than the torque distribution $T_R$ (second torque distribution), which is set in advance as a torque distribution in the non torque assist state. This is advantageous in securing suppressing abnormal noise generation against an increase in the torque fluctuation X at the time of shifting.

Further, as illustrated by the one-dotted chain line in FIG. 17, it is possible to keep the torque distribution $T_R$ at the time of shifting to the torque distribution $T_R$ (second torque distribution), which is set in advance as a torque distribution in the non torque assist state. This makes it possible to suppress an increase in the torque distribution $T_R$, while suppressing abnormal noise generation against an increase in the torque fluctuation X at the time of shifting. This is advantageous in suppressing fuel economy deterioration of the engine 14.

The control device 34 switches the abnormal noise reduction control to the abnormal noise reduction control in the torque assist state at the point of time t2 upon lapse of a predetermined period. Specifically, the torque distribution $T_R$ with respect to the rear wheels 12R is reduced to the torque distribution $T_R$ in the torque assist state.

On the other hand, in Step S705, when it is judged that shifting to the torque assist state is not detected (No in Step S705), the control device 34 continues the abnormal noise reduction control in the non torque assist state (Step S709).

As described above, in the second embodiment, when the engine 14 is shifted from the non torque assist state to the torque assist state, even if the torque fluctuation X in the torque assist state is temporarily increased, it is possible to make the torque distribution $T_R$ with respect to the rear wheels 12R larger than the torque distribution $T_R$, which is set in advance as a torque distribution in the torque assist state for a predetermined period (from the point of time t1 to the point of time t2). This makes it possible to suppress abnormal noise generation in the torque transmission mechanism 50. Further, restricting an increase in the torque distribution $T_R$ for a predetermined period makes it possible to prevent an unnecessary increase in the torque distribution with respect to the rear wheels 12R after the increase of the torque fluctuation X ceases at the time of shifting to the torque assist state. This is advantageous in suppressing fuel economy deterioration of the engine 14.

Further, it is possible to make the torque distribution $T_R$ with respect to the rear wheels 12R at the time of shifting to the torque assist state larger than the torque distribution $T_R$, which is set in advance as a torque distribution in the non torque assist state for a predetermined period. This is advantageous in securely preventing abnormal noise generation due to an increase in the torque fluctuation X as described above at the time of shifting from the non torque assist state to the torque assist state.

Further, it is possible to keep the torque distribution $T_R$ with respect to the rear wheels 12R at the time of shifting to the torque assist state to the torque distribution $T_R$, which is set in advance as a torque distribution in the non torque assist state. In this case, it is possible to suppress an increase in the torque distribution $T_R$ with respect to the rear wheels 12R, while preventing abnormal noise generation due to an increase in the torque fluctuation X at the time of shifting from the non torque assist state to the torque assist state as described above. This is advantageous in suppressing fuel economy deterioration of the engine 14.

In the embodiment, the drive motor 15 drives the crank shaft 141 via the winding transmission member 17. The invention is not limited to the above. The drive motor 15 may directly drive the crank shaft 141 via a gear. Further alternatively, the drive motor 15 may be disposed between the engine 14 and the transmission 16 to directly drive the crank shaft 141 to rotate. It is possible to apply a variety of modifications, as far as it is possible to impart an assist torque to the engine 14.

Further, in the embodiment, a four-wheel drive vehicle is provided with the front wheels 12F as main drive wheels, and the rear wheels 12R as auxiliary drive wheels. Alternatively, the embodiment is also applicable to a four-wheel drive vehicle provided with rear wheels 12R as main drive wheels, and front wheels 12F as auxiliary drive wheels.

As described above, according to the second embodiment, it is possible to suppress abnormal noise generation in the torque transmission mechanism 50, while suppressing fuel economy deterioration in a four-wheel drive vehicle provided with an engine including a drive motor which imparts an assist torque to the engine.

The aforementioned embodiments mainly include the following features.

A control device for a four-wheel drive vehicle according to an aspect of the invention is a control device for a four-wheel drive vehicle including an engine, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels. The control device is provided with an abnormal noise reduction unit which controls the torque distribution adjustment mechanism to adjust torque distribution with respect to the auxiliary drive wheels in such a manner as to suppress abnormal noise generation when the engine is operated in an abnormal noise generation range in which the torque transmission mechanism is in an abnormal noise generation state. The abnormal noise reduction unit adjusts the torque distribution with respect to the auxiliary drive wheels in accordance with a magnitude of torque fluctuation of the engine.

According to the control device, it is possible to adjust the torque distribution with respect to the auxiliary drive wheels in accordance with the magnitude of torque fluctuation. This makes it possible to suppress abnormal noise generation in the torque transmission mechanism, while suppressing fuel economy deterioration due to drive loss resulting from torque distribution with respect to the auxiliary drive wheels.

A control device for a four-wheel drive vehicle according to another aspect of the invention is a control device for a four-wheel drive vehicle including an engine which is configured to be switchable between a compression ignition mode and a spark ignition mode, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels. The control device is provided with an abnormal noise reduction unit which controls the torque distribution adjustment mechanism to adjust torque distribution with respect to the auxiliary drive wheels in such a manner as to suppress abnormal noise generation when the engine is operated in an abnormal noise generation range in which the torque transmission mechanism is in an abnormal noise generation state. The abnormal noise reduction unit makes torque distribution with respect to the auxiliary drive wheels in the compression ignition mode larger than torque distribution with respect to the auxiliary drive wheels in the spark ignition mode.

According to the control device, in the compression ignition mode in which torque fluctuation is large as compared with the spark ignition mode, making the torque distribution with respect to the auxiliary drive wheels larger than the torque distribution in the spark ignition mode makes it possible to suppress abnormal noise generation in the torque transmission mechanism in the compression ignition mode. Specifically, switching the torque distribution with respect to the auxiliary drive wheels between the compression ignition mode and the spark ignition mode makes it possible to suppress abnormal noise generation in each of the operation modes, while suppressing fuel economy deterioration of the engine.

In the control device, preferably, the abnormal noise reduction unit may increase the torque distribution with respect to the auxiliary drive wheels from the torque distribution in the spark ignition mode to the torque distribution in the compression ignition mode prior to switching an operation mode of the engine from the spark ignition mode to the compression ignition mode.

According to the control device, prior to switching the operation mode of the engine from the spark ignition mode to the compression ignition mode, the torque distribution with respect to the auxiliary drive wheels is increased from the torque distribution in the spark ignition mode to the torque distribution in the compression ignition mode. This makes it possible to prevent shortage of torque distribution with respect to the auxiliary drive wheels due to control delay when the operation mode is switched to the compression ignition mode. This is advantageous in suppressing abnormal noise generation in the torque transmission mechanism at the time of switching to the compression ignition mode.

In the control device, preferably, the abnormal noise reduction unit may increase the torque distribution with respect to the auxiliary drive wheels from the torque distribution in the spark ignition mode to the torque distribution in the compression ignition mode when the engine is operated in the abnormal noise generation range in the spark ignition mode.

According to the control device, in the abnormal noise generation range, the torque distribution with respect to the auxiliary drive wheels is always increased from the torque distribution in the spark ignition mode to the torque distribution in the compression ignition mode even if the engine is in the spark ignition mode. This eliminates the need of increasing the torque distribution at the time of switching the operation mode from the spark ignition mode to the compression ignition mode. This makes it possible to suppress abnormal noise generation in the torque transmission mechanism at the time of switching to the compression ignition mode without a delay of increasing the torque distribution with respect to the auxiliary drive wheels due to control delay.

In the control device, preferably, the abnormal noise reduction unit may control the torque distribution with respect to the auxiliary drive wheels to increase from torque distribution for abnormal noise reduction control when the vehicle is in an acceleration state, and to reduce to torque distribution for abnormal noise reduction control when the vehicle is shifted from the acceleration state to a steady state. Further, the abnormal noise reduction unit may suppress reduction of the torque distribution with respect to the auxiliary drive wheels when switching of an operation mode of the engine from the spark ignition mode to the compression ignition mode is predicted when the vehicle is shifted from the acceleration state in the spark ignition mode to the steady state.

According to the control device, when switching of the operation mode of the engine from the spark ignition mode to the compression ignition mode is predicted at the time of shifting from the acceleration state to the steady state, it is possible to suppress reduction of torque distribution with respect to the auxiliary drive wheels to the torque distribution for abnormal noise reduction control in the spark ignition mode. This makes it possible to switch the operation mode of the engine to the compression ignition mode in a state that the torque distribution with respect to the auxiliary drive wheels is kept higher than the torque distribution in the spark ignition mode. This is advantageous in suppressing abnormal noise generation in the torque transmission mechanism at the time of switching the operation mode.

In the control device, preferably, the compression ignition mode may include a premixed compression ignition mode. In this configuration, it is possible to suppress abnormal noise generation in the torque transmission mechanism in the premixed compression ignition mode.

In the control device, preferably, the compression ignition mode may further include a non-premixed compression ignition mode. Further, the abnormal noise reduction unit may make torque distribution with respect to the auxiliary drive wheels in the premixed compression ignition mode larger than torque distribution with respect to the auxiliary drive wheels in the non-premixed compression ignition mode.

According to the control device, in the compression ignition mode, the torque distribution with respect to the auxiliary drive wheels in the premixed compression ignition mode in which torque fluctuation is large is made larger than the torque distribution with respect to the auxiliary drive wheels in the non-premixed compression ignition mode. This is advantageous in suppressing abnormal noise generation in the compression ignition mode.

A control device for a four-wheel drive vehicle according to yet another aspect of the invention is a control device for a four-wheel drive vehicle including an engine, a drive motor which imparts an assist torque to the engine, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels. The control device is provided with an abnormal noise reduction unit which controls the torque distribution adjustment mechanism to increase torque distribution with respect to the auxiliary drive wheels in such a manner as to suppress abnormal noise generation when the engine is operated in an abnormal noise generation range in which the torque transmission mechanism is in an abnormal noise generation state. The abnormal noise reduction unit reduces a degree of increase of the torque distribution, as the assist torque to be imparted from the drive motor increases.

According to the control device, the drive torque generated in the engine decreases, as the assist torque to be imparted from the drive motor increases. Therefore, torque fluctuation of the engine decreases accompanied by decrease of the drive torque. In view of the above, it is effective to reduce the degree of increase of the torque distribution with respect to the auxiliary drive wheels, as the assist torque to be imparted from the drive motor increases. This makes it possible to suppress unnecessary torque distribution with respect to the auxiliary drive wheels, while suppressing abnormal noise generation in the torque transmission mechanism. This is advantageous in suppressing fuel economy deterioration of the engine.

In the control device, preferably, the abnormal noise reduction unit may make the torque distribution with respect to the auxiliary drive wheels larger than first torque distribution for a predetermined period when the engine is shifted from a non torque assist state in which the drive motor is inoperative to impart an assist torque to the engine to a torque assist state in which the drive motor imparts an assist torque to the engine, the first torque distribution being torque distribution set in advance in the torque assist state.

According to the control device, when the engine is shifted from the non torque assist state to the torque assist state, even if torque fluctuation in the torque assist state temporarily increases, the torque distribution with respect to the auxiliary drive wheels is made larger than the first torque distribution, which is set in advance as the torque distribution in the torque assist state, for the predetermined period. This makes it possible to suppress abnormal noise generation in the torque transmission mechanism. Further, restricting an increase of the torque distribution for the predetermined period is advantageous in suppressing fuel economy deterioration of the engine.

In the control device, preferably, the abnormal noise reduction unit may make the torque distribution with respect to the auxiliary drive wheels larger than second torque distribution for a predetermined period when the engine is shifted from the non torque assist state to the torque assist state, the second torque distribution being torque distribution set in advance in the non torque assist state.

According to the control device, it is possible to securely prevent abnormal noise generation in the torque transmission mechanism due to an increase in torque fluctuation when the engine is shifted from the non torque assist state to the torque assist state.

In the control device, preferably, the abnormal noise reduction unit may keep the torque distribution with respect to the auxiliary drive wheels to the second torque distribution for a predetermined period when the engine is shifted from the non torque assist state to the torque assist state, the second torque distribution being torque distribution set in advance in the non torque assist state.

According to the control device, it is possible to suppress an increase in the torque distribution with respect to the auxiliary drive wheels, while suppressing abnormal noise generation due to an increase in torque fluctuation when the engine is shifted from the non torque assist state to the torque assist state. This is advantageous in suppressing fuel economy deterioration of the engine.

In the control device, preferably, the drive motor may impart an assist torque to the engine via a winding transmission member.

According to the control device, it is possible to prevent abnormal noise generation when the drive motor for imparting an assist torque to the engine is disposed via the winding transmission member. Specifically, when the engine is shifted from the non torque assist state to the torque assist state, even if torque fluctuation increases due to a sharp change in the tension force of the winding transmission member, it is possible to prevent abnormal noise generation in the torque transmission mechanism.

This application is based on Japanese Patent Applications No. 2015-013614 and No. 2015-013615 filed on Jan. 27, 2015, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for a four-wheel drive vehicle including an engine which is configured to be switchable between a compression ignition mode and a spark ignition mode, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels, comprising:

an abnormal noise reduction unit which controls the torque distribution adjustment mechanism to adjust torque distribution with respect to the auxiliary drive wheels to suppress abnormal noise generation when the engine is operated in an abnormal noise generation range in which the torque transmission mechanism is in an abnormal noise generation state, the abnormal noise generation range being an operation range, in which the resonant frequency of the torque transmission mechanism substantially coincides with the frequency of the torque fluctuation, which is generated by intermittent explosions in each of the cylinders, wherein the abnormal noise reduction unit makes torque distribution with respect to the auxiliary drive wheels in the compression ignition mode larger than torque distribution with respect to the auxiliary drive wheels in the spark ignition mode.

2. The control device for a four-wheel drive vehicle according to claim 1, wherein the abnormal noise reduction unit increases the torque distribution with respect to the auxiliary drive wheels from the torque distribution in the spark ignition mode to the torque distribution in the compression ignition mode prior to switching an operation mode of the engine from the spark ignition mode to the compression ignition mode.

3. The control device for a four-wheel drive vehicle according to claim 1, wherein the abnormal noise reduction unit increases the torque distribution with respect to the auxiliary drive wheels from the torque distribution in the spark ignition mode to the torque distribution in the compression ignition mode when the engine is operated in the abnormal noise generation range in the spark ignition mode.

4. The control device for a four-wheel drive vehicle according to claim 1, wherein the abnormal noise reduction unit controls the torque distribution with respect to the auxiliary drive wheels to increase from torque distribution for abnormal noise reduction control when the vehicle is in an acceleration state, and to reduce to torque distribution for abnormal noise reduction control when the vehicle is shifted from the acceleration state to a steady state, and the abnormal noise reduction unit suppresses reduction of the torque distribution with respect to the auxiliary drive wheels when switching of an operation mode of the engine from the spark ignition mode to the compression ignition mode is predicted when the vehicle is shifted from the acceleration state in the spark ignition mode to the steady state.

5. The control device for a four-wheel drive vehicle according to claim 1, wherein the compression ignition mode includes a premixed compression ignition mode.

6. The control device for a four-wheel drive vehicle according to claim 5, wherein the compression ignition mode further includes a non-premixed compression ignition mode, and the abnormal noise reduction unit makes torque distribution with respect to the auxiliary drive wheels in the premixed compression ignition mode larger than torque distribution with respect to the auxiliary drive wheels in the non-premixed compression ignition mode.

7. A control device for a four-wheel drive vehicle including an engine, a drive motor which imparts an assist torque to the engine, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels, comprising:

an abnormal noise reduction unit which controls the torque distribution adjustment mechanism to increase torque distribution with respect to the auxiliary drive wheels to suppress abnormal noise generation when the engine is operated in an abnormal noise generation range in which the torque transmission mechanism is in an abnormal noise generation state, wherein the abnormal noise reduction unit reduces a degree of increase of the torque distribution, as the assist torque to be imparted from the drive motor increases, and the abnormal noise generation range being an operation range, in which the resonant frequency of the torque transmission mechanism substantially coincides with the frequency of the torque fluctuation, which is generated by intermittent explosions in each of the cylinders, wherein the abnormal noise reduction unit makes the torque distribution with respect to the auxiliary drive wheels larger than first torque distribution for a predetermined period when the engine is shifted from a non torque assist state in which the drive motor is inoperative to impart an assist torque to the engine to a torque assist state in which the drive motor is operative to impart an assist torque to the engine, the first torque distribution being torque distribution set in advance in the torque assist state.

8. The control device for a four-wheel drive vehicle according to claim 7, wherein the abnormal noise reduction unit makes the torque distribution with respect to the auxiliary drive wheels larger than second torque distribution for a predetermined period when the engine is shifted from the non torque assist state to the torque assist state, the second torque distribution being torque distribution set in advance in the non torque assist state.

9. The control device for a four-wheel drive vehicle according to claim 7, wherein the abnormal noise reduction unit keeps the torque distribution with respect to the auxiliary drive wheels to the second torque distribution for a predetermined period when the engine is shifted from the non torque assist state to the torque assist state, the second torque distribution being torque distribution set in advance in the non torque assist state.

10. The control device for a four-wheel drive vehicle according to claim 7, wherein the drive motor imparts an assist torque to the engine via a winding transmission member.

11. A control device for a four-wheel drive vehicle including an engine, a drive motor which imparts an assist torque to the engine, a torque transmission mechanism which transmits an output torque of the engine to main drive wheels and to auxiliary drive wheels, and a torque distribution adjustment mechanism which is provided in the torque transmission mechanism and configured to adjust torque distribution with respect to the auxiliary drive wheels, comprising:

an abnormal noise reduction unit which controls the torque distribution adjustment mechanism to increase torque distribution with respect to the auxiliary drive wheels to suppress abnormal noise generation when the engine is operated in an abnormal noise generation range in which the torque transmission mechanism is in an abnormal noise generation state, wherein the abnormal noise reduction unit reduces a degree of increase of the torque distribution, as the assist torque to be imparted from the drive motor increases, and the drive motor imparts an assist torque to the engine via a winding transmission member.

* * * * *